(12) United States Patent
Shi et al.

(10) Patent No.: US 9,244,096 B2
(45) Date of Patent: Jan. 26, 2016

(54) CLOSED LOOP CONTROLLER AND METHOD FOR FAST SCANNING PROBE MICROSCOPY

(71) Applicant: Bruker Nano, Inc., Santa Barbara, CA (US)

(72) Inventors: Jian Shi, Ventura, CA (US); Craig Prater, Goleta, CA (US); Ji Ma, Thousand Oaks, CA (US); Chanmin Su, Ventura, CA (US)

(73) Assignee: Bruke Nano, Inc., Santa Barbara, CA (US)

( * ) Notice: Subject to any disclaimer, the term of this patent is extended or adjusted under 35 U.S.C. 154(b) by 0 days.

(21) Appl. No.: 14/558,483

(22) Filed: Dec. 2, 2014

(65) Prior Publication Data
US 2015/0198630 A1 Jul. 16, 2015

Related U.S. Application Data

(62) Division of application No. 11/800,679, filed on May 7, 2007, now Pat. No. 8,904,560.

(51) Int. Cl.
*G01Q 10/06* (2010.01)
*G01Q 10/04* (2010.01)
*B82Y 35/00* (2011.01)

(52) U.S. Cl.
CPC ............ *G01Q 10/065* (2013.01); *B82Y 35/00* (2013.01); *G01Q 10/04* (2013.01)

(58) Field of Classification Search
CPC ..... G01Q 10/065; G01Q 20/04; G01Q 10/06; G01Q 30/06
See application file for complete search history.

(56) References Cited

U.S. PATENT DOCUMENTS

| 5,266,801 | A | 11/1993 | Elings et al. |
| RE34,489 | E | 12/1993 | Hansma et al. |
| 5,400,647 | A | 3/1995 | Elings et al. |
| 5,412,980 | A | 5/1995 | Elings et al. |
| 5,557,156 | A | 9/1996 | Elings et al. |
| 5,866,807 | A | 2/1999 | Elings et al. |
| 6,084,904 | A | 7/2000 | Wang et al. |
| 6,297,502 | B1 | 10/2001 | Jarvis et al. |
| 6,677,567 | B2 | 1/2004 | Hong et al. |

(Continued)

FOREIGN PATENT DOCUMENTS

WO 0123939 A2 4/2001

OTHER PUBLICATIONS

S. Morita, H. Yamada, and T. Ando, Japan AFM roadmap 2006. Nanotechnol. 18:08401 (10 pages) (2007).

(Continued)

*Primary Examiner* — Brooke Purinton
(74) *Attorney, Agent, or Firm* — Boyle Fredrickson S.C.

(57) ABSTRACT

A method of operating a metrology instrument includes generating relative motion between a probe and a sample at a scan frequency using an actuator. The method also includes detecting motion of the actuator using a position sensor that exhibits noise in the detected motion, and controlling the position of the actuator using a feedback loop and a feed forward algorithm. In this embodiment, the controlling step attenuates noise in the actuator position compared to noise exhibited by the position sensor in a bandwidth of about seven times the scan frequency. Scan frequencies up to a third of the first scanner resonance frequency or greater than 300 Hz are possible.

18 Claims, 11 Drawing Sheets

(56) References Cited

U.S. PATENT DOCUMENTS

| | | | |
|---|---|---|---|
| 6,951,129 | B2 | 10/2005 | Kwon et al. |
| 7,119,511 | B2 | 10/2006 | Sri-Jayantha et al. |
| 7,472,585 | B2 | 1/2009 | Abramovitch |
| 2001/0054974 | A1 | 12/2001 | Wright |
| 2004/0169509 | A1 | 9/2004 | Czipott et al. |
| 2005/0061970 | A1 | 3/2005 | Knebel et al. |
| 2005/0172703 | A1 | 8/2005 | Kley |
| 2005/0188752 | A1 | 9/2005 | Bocek et al. |
| 2005/0242283 | A1 | 11/2005 | Hasegawa et al. |
| 2006/0033024 | A1 | 2/2006 | Sparks et al. |
| 2006/0112760 | A1 | 6/2006 | Hansma et al. |
| 2006/0272398 | A1 | 12/2006 | Hwang et al. |
| 2006/0284083 | A1 | 12/2006 | Kurenuma et al. |

OTHER PUBLICATIONS

T. Uchihashi, H. Yamashita, and T. Ando, Fast Phase Imaging in Liquids Using a Rapid Scan Atomic Force Microscope. Appl. Phys. Lett. 89,213112 (3 pages) (2006).

N. Kodera, M. Sakashita, and T. Ando, A Dynamic PID Controller for High-Speed Atomic Force Microscopy. Rev. Sci. Instrum. 77(8): 063704 (7 pages) (2006).

H. Koide T. Kinoshita, Y Tanaska, S. Tanaka, N. Nagura, G. Meyer zu Horste, A. Miyagi, and T. Ando, Identification of the Specific IQ Motif of Myosin V from which Calmodulin Dissociates in the Presence of Ca2+. Biochemistry 45(38):11598-11604 (2006).

M. Yokokawa, C. Wade, T. Ando, N. Sakai, A. Yagi, S.H. Yoshimura and K. Takeyasu, Fast-Scanning Atomic Force Microscopy Reveals the ATP/ADP-Dependent Conformational Chnages of GroEL, EMBO J. 25:4567-4576 (2006).

M. Yokokawa, S.H. Yoshimura, Y. Naito, T. Ando, A. Yagi, N. Sakai, K. Takeyasu, Fast-Scanning Atomic Force Microscopy Reveals the Molecular Mechanism of DNA Cleavage by Apalendonuclease. IEE Proc Nanobiotechnol. 153(4): 60-66 (2006).

T. Ando, T. Uchihashi, N. Kodera, A. Miyagi, R. Nakakita, H. Yamashita and M. Sakashita, High-speed Atomic Force Microscopy for Studying the Dynamic Behavior of Protein Molecules at Work. Jpn. J. Appl. Phys. 45(3B):1897-1903 (2006).

T. Uchihashi, N. Kodera, H. Itoh, H. Yamashita and T. Ando, Feedforward Control tor High-speed AFM Imaging of Biomolecules, Jpn. J. Appl. Phys. 45(3B):1904-1908 (2006).

T. Ando, T Uchihashi, N. Kodera, A. Miyagi, R. Nakakita, H. Yamashita and K. Meade, High-speed AFM for Studying the Dynamic Behavior of Protein Molecules at Work. e.-J. Surf. Sci. Nanotech. 3:384-392 (2005).

N. Kodera, H. Yamashita and T. Ando, Active Damping of the Scanner for High-speed Atomic Force Microscopy, Rev. Sci. Instrum. 76:053708 (5 pages) (2005).

N. Kodera, T. Kinoshita, T. Ito and T. Ando, High-resolution Imaging of Myosin Motor in Action by a High-speed Atmic Force Microscope. Adv. Exp. Med. Biol. 538:119-127 (2003).

R. Ishikawa, T. Sakarnoto, T. Ando, S. Higashi-Fujime and K. Kohama, Polarized Acin Bundles Formed by Human fascin-1: Their Sliding and Disassembly on Myosin II and Myosin V in vitro. J. Neurochem. 87:676-685 (2003).

T. Ando, N. Kodera, Y. Naito, T. Kinoshita, K. Furuta & Y.Y. Toyoshima, A High Speed Atomic Force Microscope for Studying Biological Macromolecules in Action. ChemPhysChem 4:1196-1202 (2003).

Ando, T., N. Kodera, D. Maruyama, E. Takai, K. Saito & A. Toda, A High-speed Atomic Force Microscope for Studying Biological Macromolecules in Action. Jpn. J. Appl. Phys. 41:4851-4856 (2002).

Ando, T., N. Kodera, E. Takai, D. Maruyama, K. Saito & A. Toda, A High Speed Atomic Force Microscope for Studying Biological Macromolecules. Proc. Natl. Acad. USA 98:12468-12472 (2001).

Amitani, I., T. Sakamoto & T. Ando, Link between the Enzymatic and Mechanical Behavior in an Actomyosin Motor, Biophys. J. 80:379-397 (2001).

Sakamoto T., I. Amitani, E. Yokota & T. Ando, Direct Observation of Processive Movement by Individual Myosin V Molecules. Biochem. Biophys. Res. Commun. 272:586-590 (2000).

Adachi K., K. Kinosita, Jr. & T. Ando, Single-fluorophore Imaging with an Unmodified Epifluorescence and Conventional Video Camera J. Microscopy 195:125-132 (1999).

Nakajima H., Y. Kunioka, K. Nakano, K. Shimizu, M. Seto & T. Ando, Scanning Force Microscopy of the Interaction Events between a Single Molecule of Heavy Meromyosin and Actin. Biochem. Biophys. Res. Commun. 234:178-182 (1997).

Kunioka Y. & T. Ando, Innocuous Labeling of the Subfragment-2 region of Skeletal Muscle Heavy Meromyosin with a Fluorescent Polyacrylamide Nanobead and Visualization of Individual Heavy Meromyosin Molecules. J. Biochem. 119:1024-1032 (1996).

Yamamoto T., S. Nakayama, N. Kobayashi, E. Munekata T. Ando, Determination of Electrostatic Potential around Specific Locations on the Surface of Actin by Diffusion-enhanced Fluorescence Resonance Energy Transfer. J. Mol. Biol. 241:714-731 (1994).

Hansma, P., G. Schitter, G.E. Fantner, C. Prater, High-speed Atomic Force Microscopy. Science 314,601; DOI: 10.1126/science, 1133497 (2 pages) (2006).

Picco., L.M., L. Bozec, A. Ulcinas, D.J. Engledew, M. Antognozzi, M.A. Horton, M.J. Miles, Breaking the Speed Limit with Atomic Force Microscopy. nanotechnology 18:044030 (4 pages) (2007).

Infinitesima, The VideaAFM—Next Generation, Real-Time AFM Imaging (4 pages) (undated).

Veeco Dimension 3100 Atomic Force Microscope (AFM), Procedure (13 pages) (Nov. 20, 2006).

NanoStation II—PucoTech, http://pucotech.en.ec21.com/product_detail.jsp?group_id=GC01640383&product_id=CA . . . (5 pages) (Feb. 23, 2007).

T. Uchihashi, N. Kodera H. Itoh, H. Yamashita, T. Ando, Feed-Forward Compensation for High-speed Atomic Force Microscopy Imaging of Biomolecules. Jpn. J. Appl. Phys. 45:1904-1908 (2006).

G. Schitter, G.E. Fantner, p.J. Thurner, J. Adams, p.K. Hansma, Design and Characterization of a Novel Scanner for High-speed Atomic Force Microscopy, University of California Santa Barbara, Physics Department pp. 819-824 (undated).

S. Hafizovic, D. Barrettino, T. Volden, J. Sedivy, K.U. Kirstein, O. Brand, A. Hierlemann, Single-Chip Mechatronic Miorosystem for Surface Imgaing and Force Response Studies, PNAS, vol. 101 No. 49, pp. 17011-17015 (Dec. 2004).

G.E. Fantner, G. Schitter, H.J. Kindt, T. Ivanov, K. Ivanova, R. Patel, N. Holten-Andersen, j. Adams, p.J. Therner, I.W. Rangelow, P.K. Hansma, Components for High-speed Atomic Force Microscopy. Ultramicroscopy 106 (2006) 881-887.

T. Ando, High-Speed SPM, 14 High Speed SPM, pp. 109-116.

M.J. Rost, L. Crama, P. Schakel, E. van Tol, G.B.E.M van Velzen-Williams, C.F. Overgauw, H. ter Horst, H. Dekker, B. Okhuijsen, M. Seynen, A. Vijftigschild, P. Han, A.J. Katan, K. Schoots, R. Schumm, W. van Loo, T.H. Oosterkamp, and J.W.M. Frenken, Scanning Probe Microscopes Go Video Rate and Beyond Review of Scientific Instruments, 76,053710 (2005).

A. Zou, K.K. Leang, E. Sadoun, M.J. Reed, and S. Devasia, Control Issues in High-Speed AFM for Biological Applications: Collagen Imagin Example. Asian J. Control. Jun. 2004; 6(2): 164-178.

G. Schitter, F. Allgower, and A. Stemmer, A New Control Strategy for High-speed Atomic Force Microscopy. Nanotechnology 15 (2004) 108-114.

Q. Zou, C. Vander Giessen, J. Garbini, and S. Devasia, Precision Tracking of Driving Wave Forms for Inertial Recation Devices, Review of Scientific Instruments, 76, 023701-1 (2005).

G. Schitter, A. Stemmer, and F. Allgower, Robust 2DOF-Control of a Piezoelectric Tube Scanner for High-speed Atomic Force Microscopy, Proceedings of the American Control Conference, Denver, CO Jun. 4-6, 2003 (pp. 3720-3725).

G. Schitter, k.J. Astrom, G. DeMartini, G.E. Fantner, K. Turner, P. Thurner, and P.K. Hansma, Design and Modeling of a High-speed Scanner for Atomic Force Microscopy, Proceedings of the American Control Conference, Minneapolis, MN, Jun. 14-16, 2004 (pp. 502-507).

(56) References Cited

OTHER PUBLICATIONS

S. Devasia, Degang Chen, and Brad Paden, nonliner Inversion-Based Output Tracking, IEEE Transactions on Automatic Control, vol. 41, No. 7, Jul. 1996 (pp. 930-942).

Szuchi Tien et al. "Iterative Control of Dynamics-Coupling-Caused Errors in Piezoscanners During High-Speed AFM Operation" Control Systems Technology, IEEE Transactions on, vol. 13, Issue 6, Nov. 2005. p. 921-931.

Yen Li et al. "Feedforward Control of a Closed-Loop Piezoelectric Translation Stage for Atomic Force Microscope" Rev. Sci. Instrum., vol. 78, Issue 1 (Jan. 2007), Microscopy and Imaging.

Schitter, G.; Stemmer, A.; "Identification and open-loop tracking control of a piezoelectric tube scanner for high-speed scanning-probe microscopy," Control Systems Technology, IEEE Transactions on, vol. 12, No. 3, pp. 449-454, May 2004.

"Feedforward Control" accessed Feb. 10, 2004 version, from Chemical Engineering Department at Ben-Gurion University of the Negev.

Pao et al. "Combined Feedforward/Feedback Control of AFM" Proceedings of the 2007 American Control Conference, Jul. 11-13, 2007, pp. 3509-3515.

Leanq K. and Devasia S., "Hysteresis, creep, and vibration compensation for piezoactuators: Feedback and feedforward control", Proc. 2nd IFAC Conf. Mechatron. Syst., pp. 283-289, 2002.

CLOSED LOOP CONTROLLER AND METHOD FOR FAST SCANNING PROBE MICROSCOPY

CROSS-REFERENCE TO RELATED APPLICATIONS

This application is a divisional of U.S. patent application Ser. No. 11/800,679, filed May 7, 2007 and issued as U.S. Pat. No. 8,904,560, entitled *Closed Loop Controller and Method for Fast Scanning Probe Microscopy*. The subject matter of this application is hereby incorporated by reference in its entirety.

STATEMENT OF GOVERNMENT INTEREST

This invention was made with United States government support awarded by the following agency: NIST/ATP (Award #70NANB4H3055). The United States has certain rights in this invention.

BACKGROUND OF THE INVENTION

1. Field of the Invention

The preferred embodiments are directed to a controller for a scanning probe microscope (SPM), and more particularly, a controller for an SPM that enables improved scanning speeds while maintaining the ability to obtain high quality sample data.

2. Description of Related Art

A scanning probe microscope, such as an atomic force microscope (AFM) operates by providing relative scanning movement between a measuring probe and a sample while measuring one or more properties of the sample. A typical AFM system is shown schematically in FIG. 1. An AFM 10 employing a probe device 12 including a probe 14 having a cantilever 15. Scanner 24 generates relative motion between the probe 14 and sample 22 while the probe-sample interaction is measured. In this way images or other measurements of the sample can be obtained. Scanner 24 is typically comprised of one or more actuators that usually generate motion in three orthogonal directions (XYZ). Often, scanner 24 is a single integrated unit that includes one or more actuators to move either the sample or the probe in all three axes, for example, a piezoelectric tube actuator. Alternatively, the scanner may be an assembly of multiple separate actuators. Some AFMs separate the scanner into multiple components, for example an XY scanner that moves the sample and a separate Z-actuator that moves the probe.

In a common configuration, probe 14 is often coupled to an oscillating actuator or drive 16 that is used to drive probe 14 at or near a resonant frequency of cantilever 15. Alternative arrangements measure the deflection, torsion, or other motion of cantilever 15. Probe 14 is often a microfabricated cantilever with an integrated tip 17.

Commonly, an electronic signal is applied from an AC signal source 18 under control of an SPM controller 20 to cause actuator 16 (or alternatively scanner 24) to drive the probe 14 to oscillate. The probe-sample interaction is typically controlled via feedback by controller 20. Notably, the actuator 16 may be coupled to the scanner 24 and probe 14 but may be formed integrally with the cantilever 15 of probe 14 as part of a self-actuated cantilever/probe.

Often a selected probe 14 is oscillated and brought into contact with sample 22 as sample characteristics are monitored by detecting changes in one or more characteristics of the oscillation of probe 14, as described above. In this regard, a deflection detection apparatus 25 is typically employed to direct a beam towards the backside of probe 14, the beam then being reflected towards a detector 26, such as a four quadrant photodetector. Note that the sensing light source of apparatus 25 is typically a laser, often a visible or infrared laser diode. The sensing light beam can also be generated by other light sources, for example a He—Ne or other laser source, a superluminescent diode (SLD), an LED, an optical fiber, or any other light source that can be focused to a small spot. As the beam translates across detector 26, appropriate signals are transmitted to controller 20, which processes the signals to determine changes in the oscillation of probe 14. In general, controller 20 generates control signals to maintain a relative constant interaction between the tip and sample (or deflection of the lever 15), typically to maintain a setpoint characteristic of the oscillation of probe 14. For example, controller 20 is often used to maintain the oscillation amplitude at a setpoint value, $A_S$, to insure a generally constant force between the tip and sample. Alternatively, a setpoint phase or frequency may be used.

A workstation is also provided, in the controller 20 and/or in a separate controller or system of connected or stand-alone controllers, that receives the collected data from the controller and manipulates the data obtained during scanning to perform point selection, curve fitting, and distance determining operations. The workstation can store the resulting information in memory, use it for additional calculations, and/or display it on a suitable monitor, and/or transmit it to another computer or device by wire or wirelessly. The memory may comprise any computer readable data storage medium, examples including but not limited to a computer RAM, hard disk, network storage, a flash drive, or a CD ROM. Notably, scanner 24 often comprises a piezoelectric stack (often referred to herein as a "piezo stack") or piezoelectric tube that is used to generate relative motion between the measuring probe and the sample surface. A piezo stack is a device that moves in one or more directions based on voltages applied to electrodes disposed on the stack. Piezo stacks are often used in combination with mechanical flexures that serve to guide, constrain, and/or amplify the motion of the piezo stacks. Additionally, flexures are used to increase the stiffness of actuator in one or more axis, as described in copending application Ser. No. 11/687,304, filed Mar. 16, 2007, entitled "Fast-Scanning SPM Scanner and Method of Operating Same." Actuators may be coupled to the probe, the sample, or both. Most typically, an actuator assembly is provided in the form of an XY-actuator that drives the probe or sample in a horizontal, or XY-plane and a Z-actuator that moves the probe or sample in a vertical or Z-direction.

As the utility of SPM continues to develop, a need has arisen for imaging different types of samples at greater speeds to improve sample measurement throughput (e.g., more than 20 samples per hour) and/or measure nanoscale processes with higher time resolution than currently available. Although AFM imaging provides high spatial resolution (nanoscale), it has generally low temporal resolution. Typical high quality AFM images take several minutes to acquire, especially for scan sizes above a few microns.

Several factors can limit imaging speed, including the cantilever response time, the usable scanner bandwidth in X, Y and Z directions, the power and bandwidth of the high voltage amplifier that drives the scanner, the speed of the cantilever force sensing, as well as the demodulation system and the tracking force feedback system.

SPM images are typically constructed of arrays of measurements recorded at different locations on the sample. For example, an image may contain the local value of the relative sample height measured over an array of different XY locations on the sample. Alternative measurements can include amplitude, phase, frequency of the cantilever, electric and magnetic forces, friction, stiffness of the sample, etc.

In this regard, relative positioning between the probe and sample is very important. The quality of the acquired data, and resultant image(s), depends on the system knowing the precise location where data is collected. It follows that position errors cause image degradation, a problem exacerbated by operating the AFM at greater bandwidths.

A significant challenge in this regard is that piezoelectric stacks, tubes and other types of SPM actuators are imperfect. When considering desired scanning motion, the ideal behavior would be actuator movement substantially linearly in proportion to the voltage or other control signal applied. Instead, actuators, including piezo stacks, often move in a non-uniform manner, meaning that their sensitivity (e.g., nanometers of motion vs. applied voltage) can vary as the voltage increases. Moreover, drift, hysteresis and creep of the actuator operate to further compromise precisely positioning the probe and/or sample. With respect to hysteresis, for example, the response to an incremental voltage change will depend on the history of previous voltages applied to the actuator. Hysteresis can therefore cause a large prior motion to compromise the response to a commanded move, even many minutes later. After the command voltage is applied, the piezo may move a desired distance, but continues to move uncontrollably due to the creep effect. Such effect can be more than 10% of the commanded motion, causing a substantial positioning error.

Notably, these issues exist whether the probe device of the AFM is coupled to the actuator (i.e., the case in which the probe device moves in three orthogonal directions), or the sample is coupled to the actuator. Moreover, though known solutions attempt to overcome the above-noted challenges, they have been imperfect.

For example, some open loop methods of driving the SPM actuator have been implemented in an attempt to compensate for limitations of the controller and actuators, and thereby limit poor tracking between desired scanning movement and actual movement. The actuators may be calibrated, for example, by applying a voltage, for example, to the X-Y actuators and then measuring the actual distance that the sample or probe travels. A look-up table may then be created, and then, in operation, the actuator position can be estimated by monitoring the voltage that is applied to the X-Y and/or Z actuators. In another open loop alternative, the scanner and its motion can be modeled using rigorous mathematical techniques.

More specifically in this regard, turning to FIG. 2, open loop solutions typically involve providing a unique drive signal $u_o$ 41 that is applied to an actuator or scanner 42 of an AFM 40 to provide scanning motion between the AFM probe and the sample. The drive signal is derived, for example, from a model or a look-up table and corresponds to the desired motion of the actuator. The drive signal $u_o$ is intended to produce actual scanner motion that substantially tracks the desired motion to produce uniform scanning. See for example U.S. Pat. No. 5,557,156, owned by Veeco Instruments Inc., which describes applying non-linear drive voltages having a shape defined by a set of pre-calibrated data, to piezo actuators to drive them into substantially linear motion. The set of data may also be called a scan table. This technique has been successful for counteracting actuator non-linearities, but the calibration procedure is cumbersome and it does not adequately address drift and creep. Additionally, the actuator response depends strongly on scan speed requiring increasingly complex calibration and lookup tables as SPM scan speed increases. When the scanner turns around for scanning the next line or offsets to a different position, a transient response can be excited. Such transients can compromise data integrity. For example, transients 43 shown in FIG. 2 can exist at the turn points of a typical raster scan drive 41. Notably, to minimize transients at turning points, an alternative drive may be employed. As shown in FIG. 3, an AFM 44 may employ a drive 45 that is rounded at the turn points. This solution operates well to quiet transients at a relatively low scan rate, but at the higher scan rate the scanner motion (as shown by curve 46) still does not follow the desired trajectory (raster scan corresponding to the triangle wave form 47) in most cases. Moreover, due to the rounding, the usable range of the drive is limited.

Because such open loop solutions can be complicated and often still do not provide acceptable position accuracy, especially at higher scan speeds, some SPMs employ closed loop position control. Such systems improve accuracy by using an auxiliary position sensor in a feedback arrangement to actively monitor actuator movement, i.e., to determine how well the actual movement is tracking the commanded movement, and dynamically adjusting the control signal applied to the appropriate SPM actuator(s). In this way, the actuator can be driven in a linear way to follow a predetermined trajectory, compensating for non-linearity, hysteresis, and drift simultaneously. As a result, more accurate images can be obtained. However, the bandwidth of the position control feedback is often limited (discussed below), and the noise introduced by the sensor employed to detect actual scanner motion can degrade image quality through the feedback loop, thus further limiting the ability of the AFM to track a fast command signal during scanning, and thus produce acceptable images, at greater speeds. Due to the noise limitation, many position control feedback systems are disabled at small scan sizes. In sum, at higher imaging speeds, the performance of the position feedback system often degrades SPM system performance.

Returning to the details of closed loop position control, we turn to FIG. 4. A closed loop control system 50 is used to drive the actuator to follow a desired trajectory while minimizing position errors. A reference waveform 51 is generated as model for the desired scanner motion, a triangle wave in the example. Position sensor 54 measures the actual movement of scanner 52 and transmits that sensed signal to a summing block 56 (e.g., a digital sum or analog summing circuitry) that generates an error signal representing the difference between the desired motion of the scanner and actual scanner movement. Several auxiliary displacement or position sensors have been proposed and/or used for monitoring actuator movement, including Linear Variable Displacement Transducers (LVDTs), capacitance sensors, strain gauge and inductance sensors, and optical sensors including, for example, optical displacement sensors (ODSs) and optical interferometers. Any alternative sensor that provides a predictable and calibratable output as a function of relative position may be used. These sensors typically operate as part of a closed loop controller associated with the scanner to correct for differences between desired and actual movement.

A controller 58, such as a proportion and integral (PI) controller (or, for example, a double integrator) generates a control signal, $u_c$, in response to the error signal which is used to drive the scanner. Controllers have been implemented with both all analog electronics and digital feedback loops run by digital signal processors (DSP), field programmable gate arrays (FPGA) and other embedded controller and digital computing devices, including personal computers. The control signal operates to compensate for measured position error produced by the scanner, for example, caused by creep and drift.

Although useful for minimizing the effects of system conditions that have an adverse impact on the ability of the scanner to track desired motion, the bandwidth of conventional control systems 50 is limited. There are several reasons for the limits in conventional position control systems, including scanner resonances and position sensor noise and bandwidth limitations.

First, the resonant properties of the scanner must be considered. Each turnaround in the triangle wave reference waveform 51 creates a substantial impulse force on the scanner that can excite unwanted parasitic resonances. These resonances can also couple between axes and show up in the measured motion of the cantilever's relative motion vis-à-vis the sample. Conventional AFMs either scan slow enough to reduce the amplitude of unwanted oscillation to an acceptable level and/or trade off some scan range to round the tops and bottoms of the triangle wave reference, as noted previously in connection with the open loop system shown in FIG. 3. The inability of SPM scanners to scan large areas at high speeds without unwanted oscillations is a major bottleneck to operating SPMs at greater speeds.

Additionally, these resonances limit how fast the controller 58 can operate. A feedback loop will go unstable if there is a gain of more than one with a phase shift of 180 degrees. A simple mechanical resonance of the scanner will accumulate 90 degrees of phase shift and a substantial gain amplification at the resonance peak. The gain (and hence bandwidth) of controller 58 is limited to compensate for the phase shift and gain of the scanner's mechanical resonance(s). Even before the condition of instability, underdamped resonances can cause oscillations and overshoot in the actual motion of the scanner. As a result, operation of conventional position control feedback loops is limited to a small fraction of the scanner's lowest observed resonance, or "fundamental resonant frequency." Notably, the lowest observed resonance is most often axis dependent, with coupling of the response typically being present among axes, thereby limiting the lowest observed resonance of the scanner/actuator.

Moreover, sensor 54 introduces noise to the system that compromises the controller's ability to satisfactorily track the desired motion. The impact of sensor noise is shown schematically in FIG. 4. (In practice, of course, the sensor noise accompanies the signal) Both the scanner's real position and the sensor noise (signal 55) are compared to the reference and the resultant error processed by controller 58. The controller thus attempts to have the scanner respond to both the real position error and the unwanted sensor noise, thus producing actuator motion illustrated by signal 53. The resulting image is therefore correspondingly compromised by all the sensor noise that is within the feedback bandwidth. The control signal $u_c$, though compensating for system dynamics including thermal drift and creep, may not yield the desired scanner motion because of the additional high frequency noise introduced via the sensing scheme. Sensor noise is typically a function of bandwidth, so the position sensor electronics and/or the controller may limit the bandwidth of the sampled position sensor signal to reduce the image of this noise. The effect of a limited sensor bandwidth, however, is typically the accumulation of phase shifts in the sensor output versus the actual motion of the scanner. These phase shifts then limit the maximum gain and bandwidth that can be employed by the controller 58. The practical effect of sensor noise and bandwidth in this case is that the speed of scanning must be correspondingly reduced to maintain an acceptable level of position noise for acquiring high quality data.

Several groups have also developed schemes to counteract the effects of unwanted resonances of the scanner by developing model based control schemes. Authors on this subject include Stemmer, Schitter, Ando, Salapaka, and Zou, for example. In a typical model-based controller for SPM, the dynamic properties of the scanner are measured and an optimal closed-loop control scheme is designed to maintain stability of the feedback loop over a wide bandwidth. A typical first step is system identification, a procedure that maps the amplitude and phase response of the scanner versus frequency, defining characteristics known as the "transfer function." This transfer function may be used in a controller that achieves the highest scanner bandwidth, while also attempting to minimize oscillations due to unwanted resonances. Typical closed loop control strategies in this regard include H-infinity or H2 controllers that are described in the literature. Alternative schemes include intentionally adding impulse transients to the control waveform timed to counteract the impulse at the triangle wave turn-around. For example, an impulse force can be applied to the scanner at a time corresponding to half the oscillation period of the fundamental resonance. Destructive interference will occur between the results of the two impulses and quickly damp the unwanted oscillation. That said, because such closed loop schemes are intended to operate over a wide bandwidth, the problems associated with sensor noise continue to limit system performance.

An open loop model based controller, while compensating for scanner resonances, will still be subject to unwanted motion within the system, including scanner nonlinearities, creep and thermal drift. Thus, tracking in such systems remains imperfect. To accommodate degraded image quality, open loop feed forward controllers have been developed that attempt to model system factors, such as nonlinearities, creep and thermal drift, that impact the resultant data to produce an optimized drive waveform. Such models associated with feed forward controllers are difficult to control and typically produce less than ideal results, primarily due to the challenge of creating a workable model that fits all desired imaging conditions. Such imaging conditions often produce a change in the mechanical environment and therefore a change of the transfer function used in the model. Ultimately, producing linear scanner motion is very difficult to achieve with these open loop solutions. Therefore, an improvement was desired.

In the end, most often the design of the AFM must navigate a tradeoff between low noise performance (e.g., open loop) and image positioning accuracy (e.g., closed loop). According to one type of open loop AFM scan controller, the control scheme utilizes a calibrated scanner and corresponding input signal, such as a modified triangle wave, that is configured to account for system irregularities (e.g., resonances) when scanning. Such open loop systems utilizing a feed forward model minimize adverse effects on positioning due to system noise because extraneous structure (such as an auxiliary sensor) is minimized. However, accurate operation of the scanner and ultimate image accuracy is controlled by the system's ability to accurately characterize the scanner and otherwise account for environmental effects such as drift and creep. This is most often a difficult task that typically yields an imperfect result, given the inability to accurately model or predict particular environmental conditions. Moreover, due to this difficulty, such systems are not sufficiently robust for many applications. The open loop feed forward scheme can be effective in compensating the scanner non-linearity if the calibration is accurate and remains constant throughout the usage, but it still does not address the resonance distortion introduced by the impulse forces at the turning point of the linear triangular scanning.

The field of scanning probe microscopy was thus in need of a controller that facilitates tracking fast scanner movement with low noise while also compensating for position skewing operational conditions such as thermal drift and creep. Ideally, a closed loop scanner that minimizes the impact of sensor noise on system performance was desired.

SUMMARY OF THE INVENTION

The present invention overcomes the drawbacks of prior art AFMs using either open loop or closed loop position controllers by using an adaptive feed forward algorithm in conjunction with a closed loop feedback controller that attenuates high frequency noise introduced to the control scheme by the feedback sensor. The feedback loop operates at low bandwidth (less than the scan frequency) but is sufficient to compensate low frequency position errors introduced by phenomena such as thermal drift and creep. The feed forward algorithm is employed iteratively to achieve a threshold error (e.g., peak error of about 1% of initial scan range) in a minimum amount of time. Scan speeds significantly greater than that supported by current AFM scan controllers (from a few Hertz to, with the present invention, tens of Hertz, and even several hundred Hertz) can be achieved without compromising image quality.

According to a first aspect of one embodiment, a method of operating a metrology instrument includes generating relative motion between a probe and a sample at a scan frequency using an actuator. The method includes detecting motion of the actuator using a position sensor that introduces noise in the actuator motion, and controlling the position of the actuator using a feedback loop and a feed forward algorithm. The feed forward portion of the control performs high bandwidth position tracking by adaptively, e.g., iteratively, optimizing the feed forward waveform. The adaptive optimization can be performed, for example, upon the change of scan size, scan angle and speed. In one embodiment the sensor responses are averaged through multiple cycles of motion (data smoothing may also be employed) to substantially reduce the influence of the sensor noise. Once the feed forward algorithm achieves a minimum or threshold scan error, the finalized feed forward waveform (e.g., scan table) is used to drive the scanner in an open loop manner, yet still preserves the linearity of the sensor as if it were running in a closed loop manner. Such operation allows high speed scanning over various scan sizes, including very small scan sizes without the adverse impact of sensor noise.

More specifically, the feed forward algorithm includes using an inversion-based control algorithm that uses a transfer function associated with the actuator. The scanner drive derived from the inversion-based control algorithm predicts the impact dynamics at the turn around of the repetitive scanning and compensates the impact through a modified drive so that the physical motion of the scanner follows the trajectory of the reference substantially precisely. In a further aspect of this embodiment, the inversion-based control algorithm iteratively produces a correction that contributes to a control signal that compensates for non-linearities of the actuator.

According to yet another aspect of this embodiment, the control signal produces a peak position error of less than about 1% of the total scan range after no more than about 10 iterations of 10 scan lines per iteration. More preferably, the control signal produces a peak position error of less than about 1% of the total scan range after no more than about 5 iterations.

In a still further aspect of this embodiment, the scan frequency is at least $1/100^{th}$, and preferably, $1/10^{th}$ the fundamental resonant frequency of the actuator. More preferably, the scan frequency is at least $1/3^{rd}$ the fundamental resonant frequency of the actuator.

According to another aspect of this embodiment, the resonant frequency of the actuator is greater than about 900 Hz and the scan frequency is at least about 10 Hz, but preferably the scan frequency is at least about 100 Hz. More preferably, the scan frequency is at least about 300 Hz.

According to a still further aspect of this embodiment, a method of operating a metrology instrument includes generating, with an actuator, relative motion between a probe and a sample at a scan frequency over a selected scan size, from tens of nanometers to tens of microns, and detecting motion of the actuator using a position sensor. The method also includes controlling, with at least one of a feedback loop and a feed forward algorithm, the generating step to substantially follow a reference signal to achieve an integral position error of the relative motion compared to the reference signal that is less than about 1% of the scan size. In this case, the contribution of the position sensor noise is reduced to less than about 1 Angstrom RMS, by averaging the data during iterations. In the one embodiment, the scan bandwidth is equal to about at least seven times the scan frequency.

In another aspect of this embodiment, the bandwidth of the feedback loop is much less than the scan frequency, sufficient substantially only to correct very slow drift due to piezo creep.

In yet another aspect of this embodiment, a scanning probe microscope (SPM) includes an actuator that generates relative motion between a probe and a sample at a scan frequency. The SPM also includes a position sensor that detects motion of the actuator and generates high frequency noise, while a controller generates a position control signal based on the detected motion. In this embodiment, the controller attenuates the noise to less than about 1 Angstrom RMS within a noise bandwidth equal to at least seven times the scan frequency.

In another aspect of this embodiment, the feed forward algorithm includes using an inversion-based control algorithm that is used iteratively to produce a correction of the scanning drive wave form that contributes to a control signal that compensates for non-linearities of the actuator. In one embodiment, the correction is a scan table.

According to a still further aspect of this embodiment, a method of operating a metrology instrument includes generating relative motion between a probe and a sample at a scan frequency using an actuator. The method also includes detecting motion of the actuator using a position sensor, the position sensor exhibiting noise in the detected motion. The method also compensates for position error of the actuator using both a feedback loop and a feed forward algorithm in which the bandwidth of the feedback loop is less than the scan frequency.

In yet another embodiment, a method of operating a metrology instrument includes generating relative motion between a probe and a sample at a scan frequency using an actuator. The method further includes detecting motion of the actuator using a position sensor which exhibits noise in the detected motion. The position of the actuator is controlled using a feedback loop and an adaptive feed forward algorithm. More particularly, the controlling step attenuates impact of the noise in the detected motion on the actuator motion over a noise bandwidth equal to at least seven times the scan frequency. And, the adaptive feed forward algorithm repeatedly updates the generating step in response to the detected motion of the actuator.

According to another aspect of this embodiment, the adaptive feed forward algorithm iteratively determines a correction to the generating step. Notably, the generating step includes using a reference signal that is a triangle wave, and the method may include reducing ripple in the triangle wave using a window. In one example, a Hanning window is used.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

The preferred embodiments of the present invention are directed to a closed loop SPM scanner having a low bandwidth feedback control loop combined with a parallel feed forward control loop that improves AFM scan speed while maintaining positioning integrity so that image degradation typically seen at higher scan speeds is minimized. More specifically, the feed forward algorithm uses an inversion-based algorithm to intelligently control the drive signal applied to the scanner at high bandwidth so that actual scanning motion tracks the desired scanner motion. And, by operating the feedback control loop with relatively low gain, the adverse positioning effects due to high frequency noise (e.g., sensor noise), are substantially minimized. Overall, open loop SPM performance (i.e., low noise) is achieved with minimal image degradation.

Figure 4:
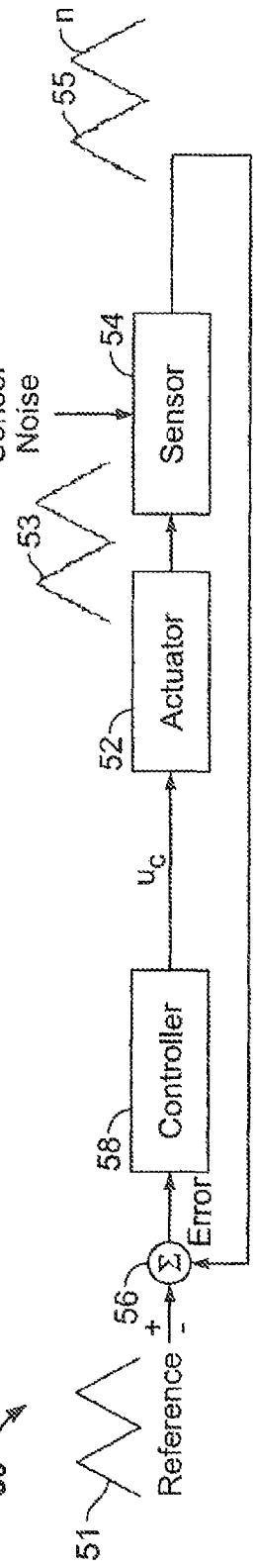
FIG. 4 is a block diagram of a prior art closed loop SPM scanner, appropriately labeled "Prior Art"
Figure 5:
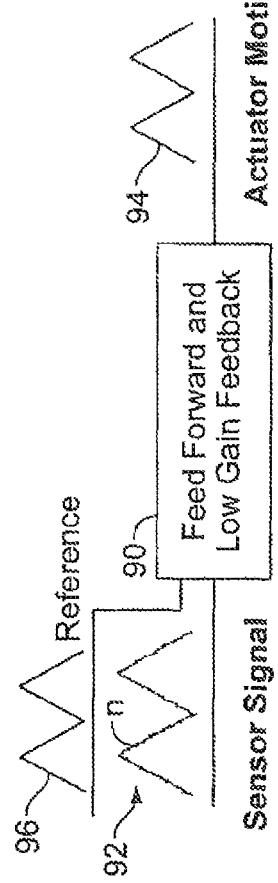
FIG. 5 is block diagram of a controller according to a preferred embodiment that utilizes low gain feedback and a high bandwidth feed forward algorithm to provide uniform scanner motion, schematically illustrating sensor noise essentially eliminated from the actuator motion.

To highlight the benefits of the preferred embodiments, reference is initially made to FIGS. 4 and 5. In FIG. 4, as a standard controller 58 for a typical AFM includes a high gain feedback loop that measures and monitors the movement of a scan actuator in comparison to a reference signal to attempt to maintain uniform motion in an intended path (e.g., a raster scan). Though operating to provide relatively uniform and linear actuator motion, the sensor used in the feedback loop introduces a noise component "n" to the detected motion 55 that is processed by controller 58. As a result, actuator motion, though substantially linear is compromised by the noise introduced by the sensor signal 92. The corresponding data, therefore, may, and typically does, yield a degraded image, especially at small scan sizes. Furthermore, the limited feedback bandwidth causes an increased tracking error at higher scan rate, yielding a distorted image at higher scan rate. Turning to FIG. 5 schematically illustrating the apparatus of the preferred embodiments, a controller 90 similarly acquires a sensor signal that includes sensor noise, "n," but the controller includes an architecture that has a feed forward component that operates in conjunction with a feedback component operating at low gain (i.e., low bandwidth, e.g., less than the scan frequency) to minimize the impact of sensor noise on the control signal applied to the scan actuator, and thus actuator motion 94 more accurately follows the desired reference signal 96. With the high frequency portion of the sensor signal 92 (i.e., noise) attenuated, image degradation is significantly lessened. Overall, whereas prior art AFMs with closed loop scanners may include sensor noise in the range of up to about 2 nm RMS, controller 90 attenuates sensor noise so it can be maintained at less than about 0.1 nm RMS during scanning. As a result, much greater scanning speeds can be achieved without degrading image quality, i.e., the position error of the actuator is within 1% of scan size.

Figure 1:
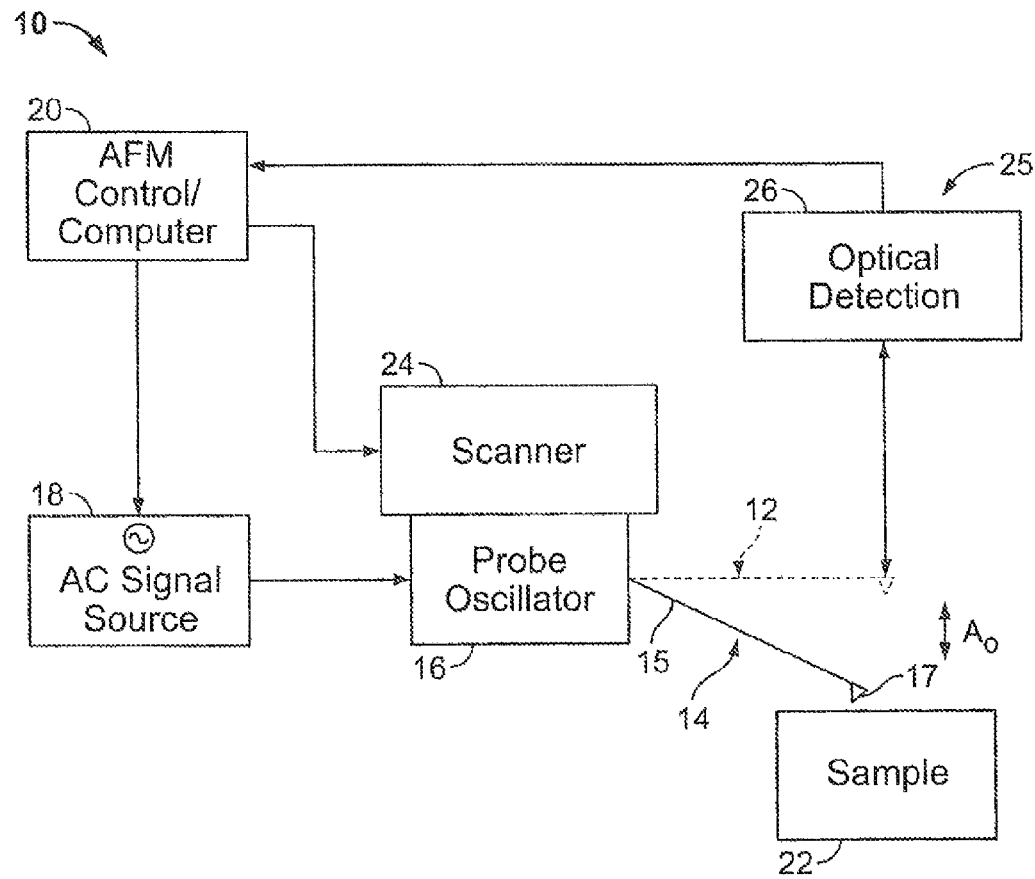
FIG. 1 is a block diagram illustrating a prior art scanning probe microscope (SPM), appropriately labeled "Prior Art"
Figure 2:
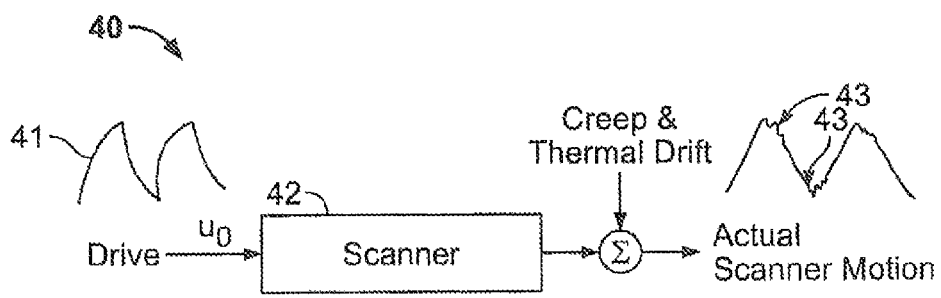
FIG. 2 is a block diagram illustrating a prior art open loop SPM scanner, appropriately labeled "Prior Art"
Figure 6:
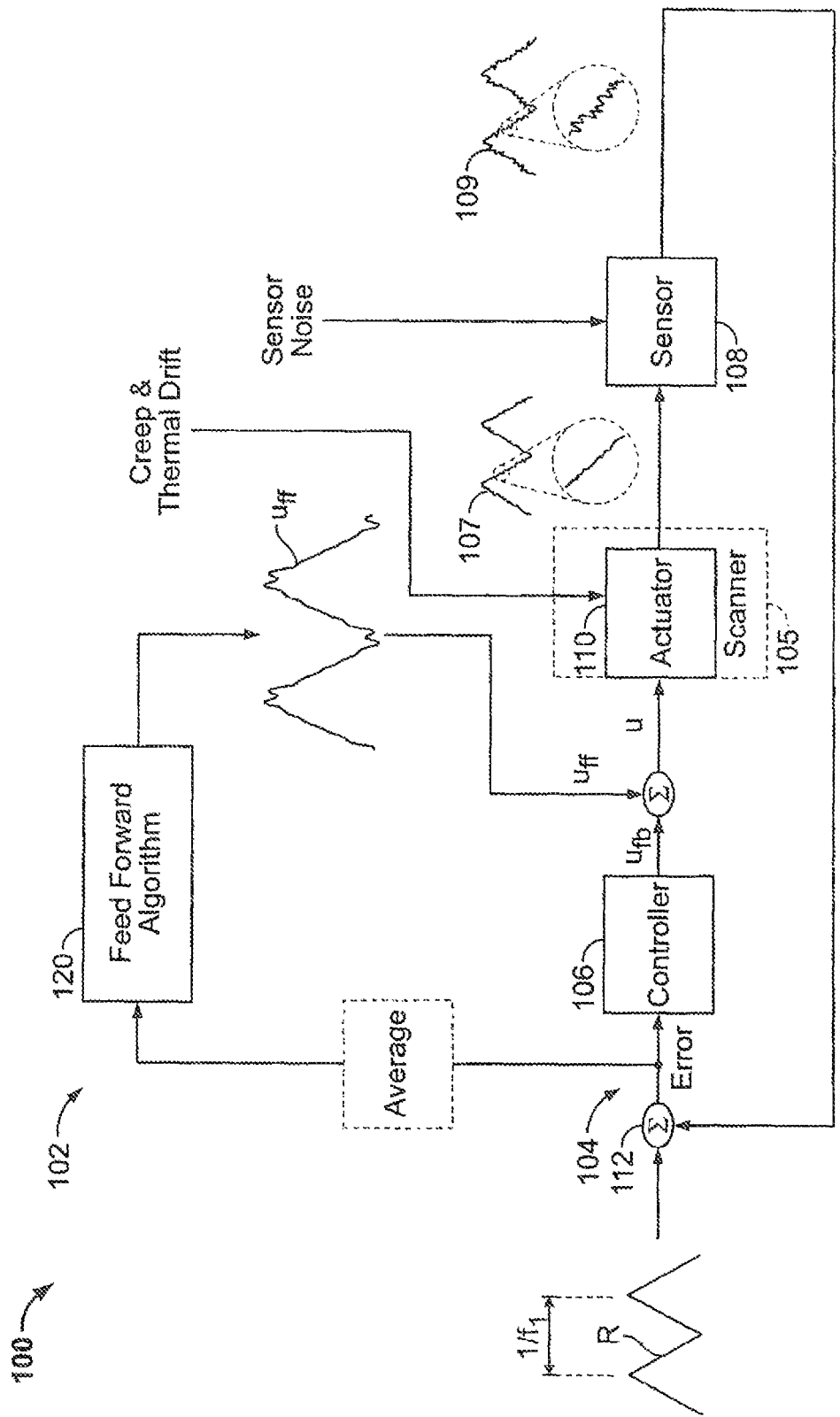
FIG. 6 is a block diagram of a closed loop scanner having a parallel feed forward control loop according to a preferred embodiment.

We will now describe one implementation of a controller that operates at a high scan frequency and that minimizes the effects of creep, thermal drift and the dynamics of a scanner 105 while rejecting position sensor noise. As shown in FIG. 6 controller 100 is configured to employ a reference waveform, signal, or dataset "R" (for example, a triangle wave) representative of the desired scanning motion which, during operation, is compared to the measured motion of an actuator 110 of a scanner 105 using a comparison block 112. Actuator 110 may be coupled to a probe as shown in FIG. 1, or the sample, or may include a combination of components that provide motion to either or both. Note that probe 14 is often a microfabricated cantilever with an integrated tip. Probe alternately can be any of the wide field of probes that are used in scanning probe microscopy (SPM), including, but not limited to, scanning tunneling microscope tips, probes for magnetic force microscopy, electric force microscopy, surface potential microscopy, chemical force microscopy, probes with carbon nanotube or carbon nanofibers, and probes for aperture-based or apertureless near-field scanning optical microscopy.

Controller 100 in this embodiment employs a relatively slow feedback loop 104 that compensates for position errors from low frequency sources like creep and drift, as well as a feed forward loop 102 that compensates for scanner dynamics and/or nonlinearities.

Figure 3:
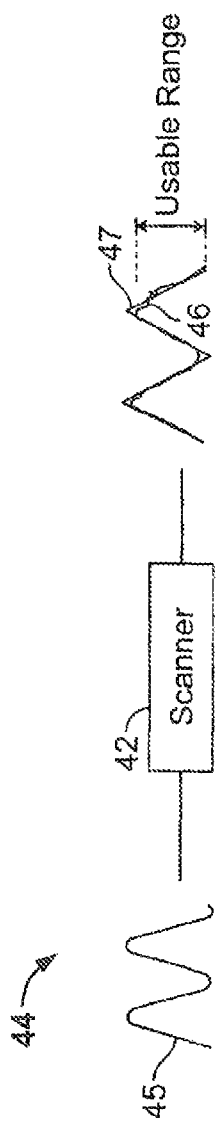
FIG. 3 is a block diagram illustrating an alternate prior art open loop SPM scanner, appropriately labeled "Prior Art"

When scanner 105 performs zig-zag raster scanning the turn around motion corresponds to a large increase in deceleration and acceleration force. Such force, as described previously, contains many high frequency excitations which can cause the scanner to resonate uncontrollably. When such resonant motion is superimposed on the linear motion of the scanner, the image will be distorted, showing ripples in the data adjacent to the turn around corner. And severe resonance can lead to a ripple effect throughout the entire image. To reduce the impact of a sharp corner at the turn around, the reference waveform R may be low pass filtered to produce a rounded shape at the peaks, as shown in FIG. 3. In one embodiment, the reference waveform R is synthesized by summing together the first four Fourier terms of a triangle wave at the scan frequency $f_1$. The first four Fourier components including the fundamental $f_1$ and three overtones at $3f_1$, $5f_1$, and $7f_1$ give a good approximation of a linear triangle wave, with the possible exception of a smoother transition at the peaks. It is possible to use more or fewer Fourier components depending on the desired tradeoff between linearity and impulse forces at the turnaround. In one embodiment, a window technique, for example but not limited to a Hanning window, is used to adjust the Fourier components to reduce the amount of ripple caused by the finite number of Fourier components. The ripple amplitude can be reduced to $\frac{1}{20}^{th}$ of the ripple amplitude by applying such a window.

The division of labor between the feedback and feed forward loops is possible because thermal drift and piezo creep typically occur at substantially different times than scanner motion and scanner dynamics. Thermal drift and piezo creep have time constants on the scale of seconds to hours, corresponding to frequencies of about 0.1 Hz to $10^{-5}$ Hz. On the other hand, typical conventional AFMs have scanner dynamics in the range of $10^2$ Hz range with fast AFMs having dynamics in the $10^3$ to $10^4$ Hz or higher. Typical AFM scan speeds range from roughly 0.1 Hz to 10 Hz for conventional AFMs, and up to 10 Hz to $10^4$ Hz for higher speed AFMs. Thus the low bandwidth feedback loop is generally arranged to have a bandwidth of less than the scan frequency, but higher than the frequency associated with drift and creep. As an example, for an SPM system scanning at 30 Hz, a feedback bandwidth of 1 Hz is well above that required to compensate for drift and creep, but still well below the scan frequency.

Prior art feedback loops, as shown for example in FIG. 4, are typically arranged to have a controller 58 with a bandwidth well above the maximum scan frequency so that they can faithfully reproduce the reference waveform 51. This wide bandwidth requirement introduces a larger fraction of the sensor noise into the motion of the scanner. In the current embodiment, however, the low bandwidth of the feedback loop substantially attenuates the effect of the sensor noise to scanner/actuator motion.

To illustrate this effect with an example, consider a scanner operating at a scan frequency $f_1$ of 10 Hz and subjected to a random sensor noise. To faithfully reproduce a triangle wave reference waveform, the closed loop bandwidth is at least several times the frequency of the reference waveform. If, as described above, it is desirable to have at least the first four Fourier components of the triangle wave well reproduced, then the prior art feedback loop would need to have a scan bandwidth of $7f_1$, or roughly 70 Hz. If however, the feedback loop is only required to compensate for creep and/or drift, a bandwidth of 0.1 Hz may be chosen, for example. In a simple case, the sensor noise is a white noise. So cutting the feedback bandwidth from 70 Hz to 0.1 Hz may result in attenuating the impact of sensor noise on actuator position by a factor of $$\sqrt{\frac{70}{0.1}} = 26.$$

For a high speed AFM, operating at a scan frequency of say 500 Hz, the improvement in sensor noise impact could be almost a factor of 200 over the feedback loop architecture of FIG. 3.

Note that the bandwidth of $7f_1$ used in this example to estimate the noise attenuation figure is not required for the present invention. Instead, it is simply used as a convenient benchmark to estimate the reduction in the impact of the sensor noise on the actuator position. A scan bandwidth can be selected to be larger or smaller than $7f_1$ depending on the accuracy desired for the scan waveform. Higher scan bandwidths increase the number of Fourier components used to construct the scan waveform.

Noise in actuator position may be measured in any of several ways. It is possible, for example, to measure the voltage noise of the control signal u (FIG. 6) that drives the actuator, and multiply this by the actuator sensitivity. The total noise in a specified noise bandwidth can be used to characterize the noise performance of the system. Note that we distinguish the term "scan bandwidth" from "noise bandwidth." Noise bandwidth defines the bandwidth over which a noise measurement is performed. By specifying a noise bandwidth for noise evaluation purposes, we are not implying that the system's scan bandwidth be the same. Also note that the generally triangular waveform would be removed from the data prior to a noise analysis. Alternatively, one can measure the noise in the location of a topographic feature, for example the position of a step edge on a graphite surface as observed in a SPM image. A traditional closed loop AFM image may show noise of one to several nm on such a step edge, while the current invention can achieve noise of less than 1 Å, on par with the operation of a quality open loop scanner.

Returning to the feedback system, loop 104 employs a closed loop feedback controller 106 (a PI control block, for instance, implemented digitally or with analog circuitry), and a sensor 108 which yields a signal 109 representative of detected motion of a scan actuator 110 in response to the input signal, u. Note the large noise component associated with the detected motion 109. It is this noise that introduces noise in the actuator position, illustrated by signal 53 in FIG. 4, using known AFM controllers. However, when using the controller of this embodiment, the actuator position, as represented by signal 107 in FIG. 6, follows the trajectory of desired scanning motion as represented by reference R. Overall, contrary to known AFM controllers, noise associated with actuator position (signal 107) compared to the noise associated with the detected motion (signal 109) is dramatically reduced, as shown schematically (exploded) in FIG. 6.

In one embodiment, closed loop feedback controller 106 contains only integral gain for high rejection of sensor noise and low steady state error. In this embodiment, the value of the integral gain is set to provide a control bandwidth sufficiently low to allow substantial rejection of sensor noise, yet sufficiently high bandwidth to compensate for low frequency creep and/or drift. In this embodiment, the integral gain is set such that the feedback bandwidth is generally lower than the scan frequency. Alternatively, controller 106 may be a PI or PID controller, for example. It may also be a more complex model-based controller that uses prior knowledge about the system properties, nonlinearities and/or hysteretic behavior in addition to feedback.

Based on the position error determined by comparison block 112 feedback controller 106 generates an appropriate control signal, $u_{fb}$. Comparison block 112 may comprise analog circuitry and/or digital computation element(s) that create a signal and/or data representative of the error between the reference waveform and the measured actuator trajectory. (Note that the contribution to u from feed forward branch 102 (i.e., $u_{ff}$) will be discussed below.) Controller 106, and specifically $u_{fb}$, operates to compensate the low frequency position error between reference signal "R" defining desired scanner motion and actual scan actuator scanner motion as represented by the output signal of sensor 108. As a result, adverse effects on relative probe-sample positioning due to creep and/or thermal drift are minimized. Moreover, by operating at low bandwidth, the adverse positioning effects of the sensor noise (high frequency noise) on the control signal, u, and thus on actuator motion, are minimized, as described above. In one embodiment, the actuators 110 for the x, y and z axes are piezoelectric stacks coupled to flexures with different amounts of stiffness, as described in copending application Ser. No. 11/687,304, filed Mar. 16, 2007, entitled "Fast-Scanning SPM Scanner and Method of Operating Same." However, the actuators can also employ any number of alternative actuation technologies, including but not limited to, piezoelectric tubes or other piezoelectric devices, actuators formed from electrostrictive, magnetorstrictive, electrostatic, inductive, and/or voice coil drive mechanisms and other actuators that generate motion in response to an input signal. Actuator 110 may by itself make up a scanner, for example in the case of a piezoelectric tube. Actuator 110 may also be a component of scanner 105 that contains other components, for example, flexure elements that guide and/or amplify the actuator motion. In practice, the dynamics of both the actuator and the other scanner components can otherwise limit the maximum scan frequency. The current invention can be used to generate improved performance of both individual actuators and more complex scanner assemblies.

Position sensor 108 most often produces a signal that is indicative of the position of actuator 110. Suitable position sensors may also produce a signal that is indicative of actuator velocity which may then be integrated (e.g., by a processor) to determine the relative actuator position. Position sensors may be arranged to measure the motion of the actuator directly or the position of a separate reference point or surface that is moved by the actuator. Position sensor 108 may further include a preamplifier and/or signal conditioning that amplify, linearize, and/or demodulate the raw signal from the sensor into one that can be better used by the controller.

We now turn to the operation of the feed forward algorithm. Referring again to FIG. 6, feed forward branch 102 of controller 100 utilizes a feed forward control algorithm 120 to facilitate high speed scanning with minimized scanner resonance distortion. In general, a feed forward algorithm is an algorithm that uses prior knowledge of the properties of a system to estimate a control signal required to generate desired output. Feed forward control algorithm 120 is described in further detail below, but primarily uses knowledge of the actuator (or scanner unit) dynamics (i.e., non-linearities, etc.) to generate a feed forward component, $u_{ff}$, of the scanner control signal u that drives actuator 110 along a desired trajectory.

In one embodiment, actuator 110 is exercised with a first estimate of a waveform $u_{ff}$ that will drive the actuator to approximate the reference waveform. This estimate can come from a prior measurement or an initial calibration step, for example. Controller 100 updates the drive waveform $u_{ff}$ to minimize high frequency errors in scan position (output of comparison block 112) by generating an updated scan control waveform $u_{ff}$. In one embodiment, the waveform $u_{ff}$ contains elements that suppress oscillation of parasitic resonances of the scanner and/or correct for non-linearities in the actuator. Known versions of feed forward control algorithms have been described generally in Stemmer, Schitter, Ando, Salapaka, Devasia, and Zou, for example G. Schitter et al., "A new control strategy for high-speed atomic force microscopy, Nanotechnology 15 (2004) 108-114; Q. Zou et al., "Control Issues in High-speed AFM for Biological Applications: Collagen Imaging Example, Asian J Control 2004 June; 6 (2): 164-178; and S. Devasia, et al., "Nonlinear Inversion-Based Output Tracking," IEEE Transactions on Automatic Control, Vol. 41, No. 7 (pp. 930-942) (1996), each of which is expressly incorporated by reference herein.

More particularly, in this case, the feed forward branch 102 of controller 100 operates to reduce, for example, periodic errors, including high frequency position errors, by accounting for the dynamics (e.g., non-linearities) of actuator 110 and/or overall scanner 105 during AFM scanning. In one embodiment, feed forward algorithm 120 is an adaptive algorithm, sometimes referred to hereinafter as an inversion-based iterative control (IIC) algorithm, that operates using sensor error to determine an appropriate control signal $u_{ff}$ for correcting position error. The IIC algorithm inverts the transfer function of the scanner or actuator. Based on the sensor error and previous control signals, IIC calculates a new control signal $u_{ff}$ that is likely to reduce the measured position errors over the scan. One such IIC algorithm is described by Zou et al. in "Precision tracking of driving wave forms for inertial reaction devices", Review of Scientific Instruments 76 023701 (pp. 203701-1-203701-9), (2005). In one embodiment, the scan control signal $u_{ff}$ is computed as a scan table, or an array of control values as a function of scan position and/or time. The scan table associated with the scan actuator is updated repeatedly to generate an appropriate $u_{ff}$ to minimize the position error as quickly as possible.

Figure 7:
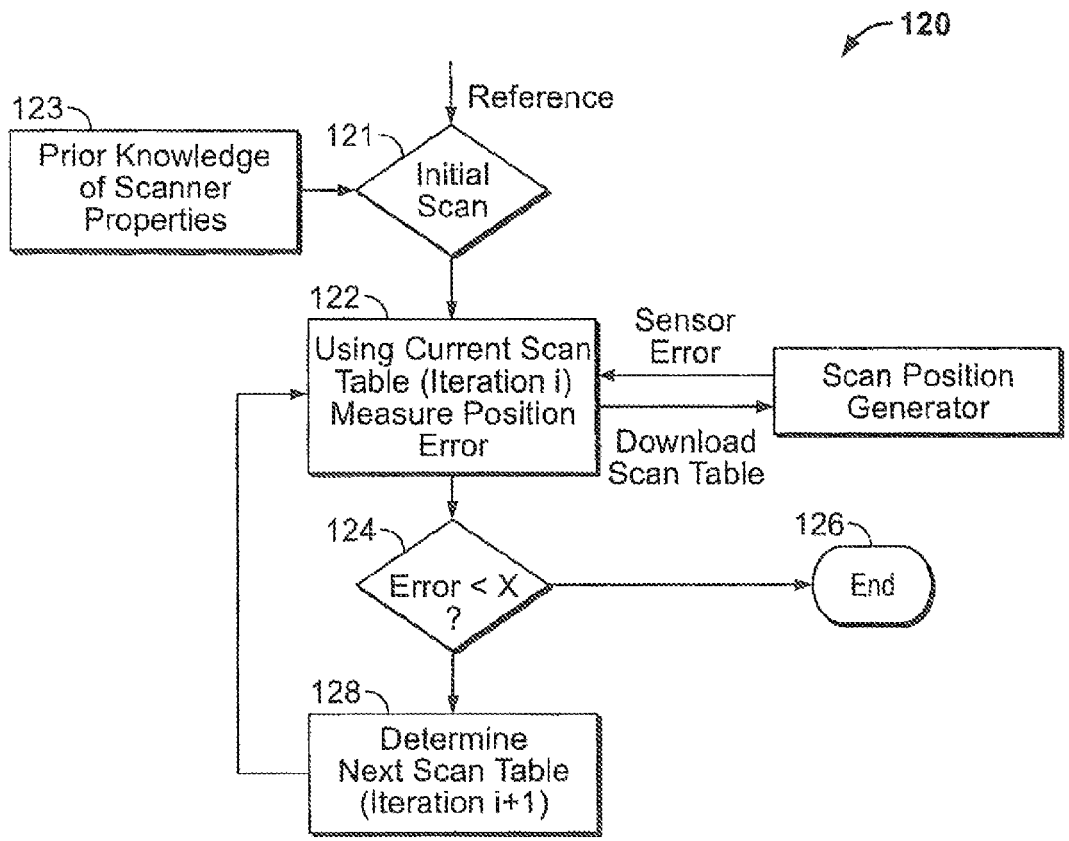
FIG. 7 is a flow chart illustrating operation of the adaptive feed forward algorithm of the controller of FIG. 6.

With reference to FIG. 7, the operation of feed forward algorithm 120 is discussed in further detail. When initiating AFM operation, a user typically runs a survey scan on the sample. When a region of interest is identified, the user inputs an offset, scanning size and speed, and an initial scan table is determined in Block 121 by either previously stored parameters or a modeled scan table based, for example, on those user inputs and transfer function inversion (described further below with respect to FIG. 8). A test scan is then performed using this initial scan table (Block 122), and the position error relative to the target reference is measured. The algorithm then determines, in Block 124, whether the position error relative to the scan size is less than some percentage, "x." If so, operation of the feed forward branch 102 of controller 100 is terminated in Block 126 with position errors compensated using the current scan table to generate an appropriate $u_{ff}$. If not, the controller initiates a new iteration by combining the current error and newly adjusted model to generate a new scan table to further reduce the error. The new scan table is determined with the next iteration of the feed forward algorithm, "i+1," in Block 128. More particularly, in Block 122, this new generation scan table is used to drive the scanner (i.e., a correction is determined to update the drive) and a new scanning error is then compared with the error margin "x" again. Optionally, the sensor error may be averaged by performing multiple cycles of scanning, as noted previously, to substantially reduce the noise contribution to the error determination. Continuing iteration(s) will eventually reduce the error below "x" and the final scan table becomes the drive table for the scanner under current user input parameters. The feed forward algorithm will iterate until the current scan table yields a position error less than the selected "x" percentage. In practice, the criterion of the final iteration error is usually set as less than about 1% of the full image size, corresponding to a few pixels of data in a 512 pixel scan line.

In one embodiment, the position error used by decision block 124 in FIG. 7 is the peak error over the scan waveform. It can optionally be the integral error over the scan waveform, a subset of the integral error, an RMS error, or any other data or computation that is related to a difference between the commanded position and the position measured by a position sensor.

In some embodiments, as discussed further below in connection with FIGS. 10-12, the ideal threshold of peak error to total scan size is about 1% and a position noise less than about 1 Angstrom RMS within a noise bandwidth equal to about seven times the scan frequency. This result can be achieved in about 3-4 iterations of the feed forward algorithm, and in some cases may be achieved with initial scan waveform. In practice, this means that position error can be reduced to the 1% threshold in about 2 seconds. Stable positioning that yields minimal image degradation is thereafter maintained at high bandwidth, with the $u_{ff}$ waveform/signal/data array controlling positioning at high bandwidth, and $u_{fb}$ correcting for low bandwidth position errors such as thermal drift and piezo creep. It is notable that for higher scan speeds, it may take several iterations (for example, more than 5) to converge to the 1% threshold. In most cases, however, the threshold can be reached in less than 5 seconds, and preferably less than two seconds.

Figure 8:
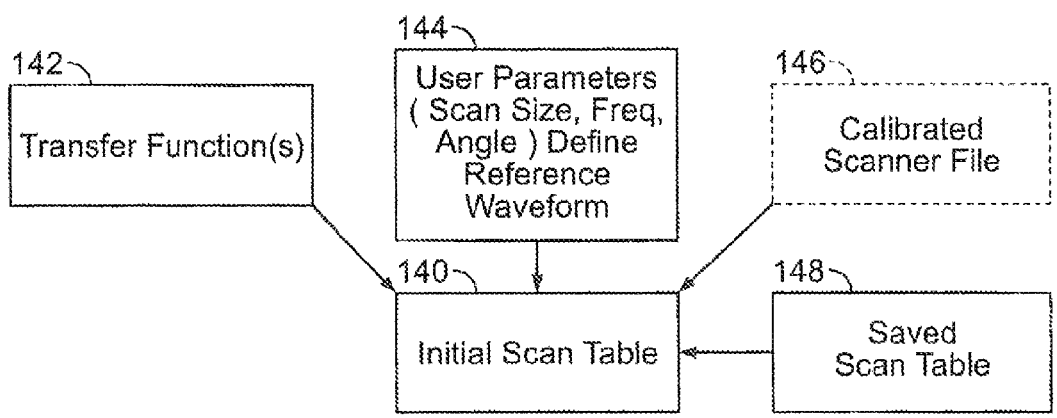
FIG. 8 is a block diagram illustrating production of an initial scan table for the feed forward algorithm.
Figure 9A:
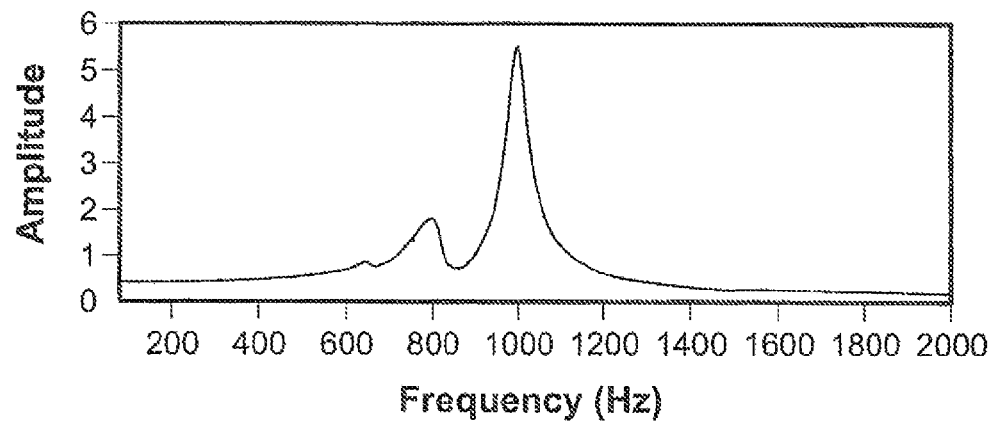
FIGS. 9A and 9B are graphs illustrating the transfer function of the actuator, including the amplitude and the phase responses, respectively.
Figure 9B:
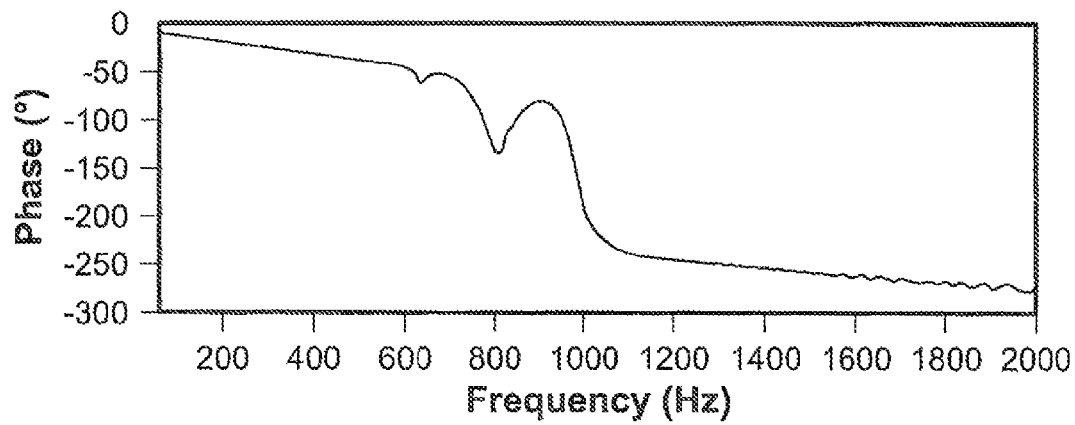

Turning to FIG. 8, a block diagram illustrating the components used to produce an initial scan table 140 processed by feed forward algorithm 120 is illustrated. A first component of initial scan table 140 is identifying one or more transfer functions 142 associated with the actuator 110 and/or scanner as a whole (multiple transfer functions may be employed for multiple axes and possibly coupling between the axes) to capture its dynamics). Transfer functions 142 represent the dynamics of actuator 110. When a drive waveform (e.g., a triangle wave) is applied to scan actuator 110, typically over a range of frequencies, and the motion of the actuator is measured with a sensor, the scan actuator yields a particular response, the transfer function. A transfer function is illustrated graphically in FIGS. 9A and 9B. FIG. 9A shows the amplitude response of the actuator when a constant amplitude drive signal is swept over a range of frequencies. FIG. 9B illustrates the corresponding phase response of the scanner. Note that the transfer function may change based upon operating conditions, and that scanner dynamics represent more than the transfer function(s) (which define the linear part of the dynamics). Notably, the pre-determined transfer function is used as part of an overall scheme to optimize the drive waveform $u_{ff}$.

The transfer functions can be obtained by conventional system identification methods. For example, by exciting the scanner with a signal of known frequency and amplitude, the scanner response divided by the drive signal defines gain and phase at that frequency. By sweeping frequency throughout the desired range, the transfer function, which is the gain and phase as a function of frequency for the scanner, can be measured. It can also be measured through gain and phase of the response when exciting the scanner with white noise or from system modeling. FIGS. 9A and 9B show an actuator having dynamics at frequencies approaching 1 kHz.

The transfer function more specifically represents the expected response of the actuator to a particular input. In operation, feed forward algorithm 120 operates to invert the transfer function, and based on the error (output of Block 112 in FIG. 6) and previous scan tables, determines an appropriate scan table to provide an appropriate control signal, $u_{ff}$ to compensate, in this case, the position error.

With further reference to FIG. 8, the initial scan table is also defined by user selected parameters 144 such as scan size, scan angle and operating frequency. Notably, using the preferred embodiments, scan frequencies up to at least one-third the resonant frequency of the scan actuator can be achieved while maintaining position stability. For the scanner illustrated in FIGS. 9A and 9B, this means a scan speed of about 300 Hz can be achieved. This is in stark contrast to known AFMs which typically scan in the single Hz range. The initial scan table may also be defined by a calibrated scanner file 146. Though not necessary to operate the preferred embodiments, calibrated data associated with the scan actuator may be used in the generation of the initial scan table. These calibrated data is acquired by scanning a sample with an array of features having known linear dimensions. Finally, the initial scan table for the current measurement may be modified by saved scan tables associated with the scan actuator. For instance, scan table information corresponding to prior experiments performed by the scan actuator can be employed to produce an initial scan table that more accurately reflects actual actuator response in operation, potentially providing a correspondingly greater chance of achieving the threshold error upon the first iteration of the feed forward algorithm. The effect of calibration is shown in FIG. 12, discussed further below.

Figure 10:
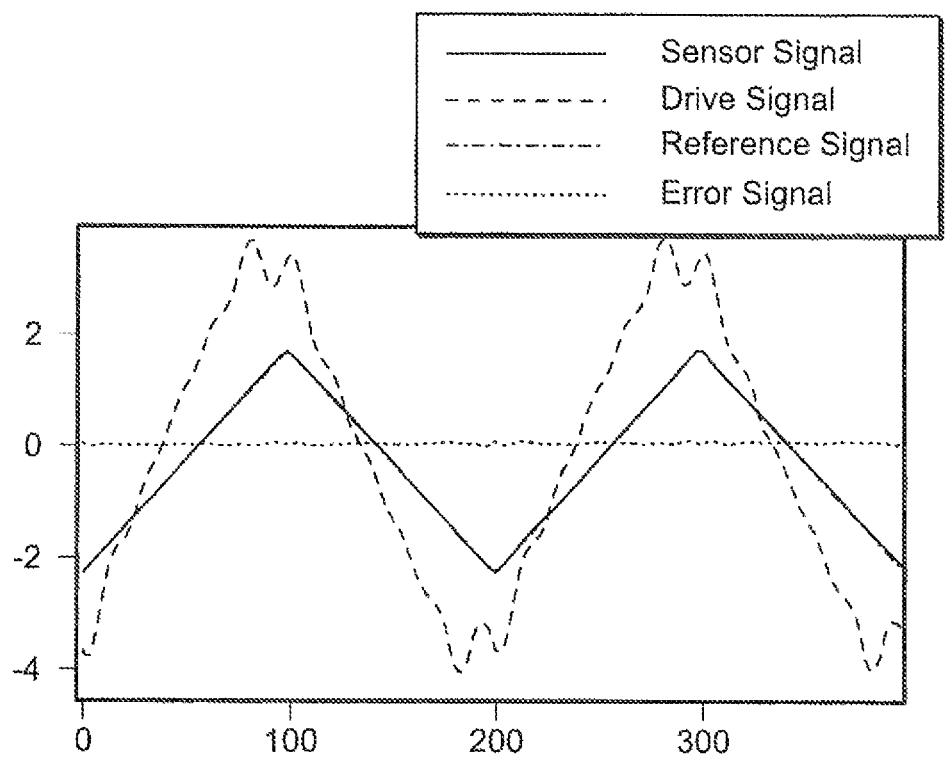
FIG. 10 is a graph illustrating the performance of the controller shown in FIG. 6, particularly in reducing positioning error.
Figure 11:
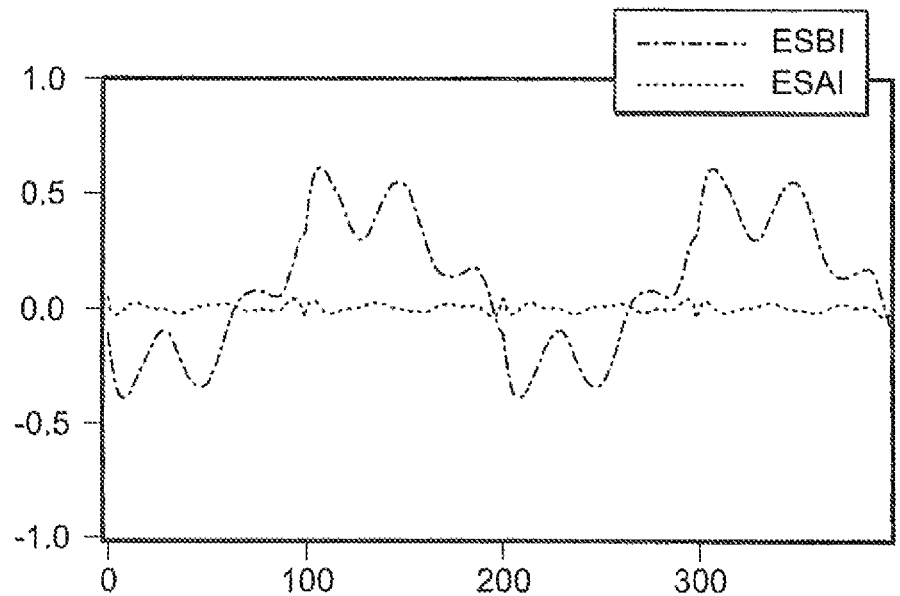
FIG. 11 is a graph illustrating a blown-up version of the graph in FIG. 10.
Figure 12:
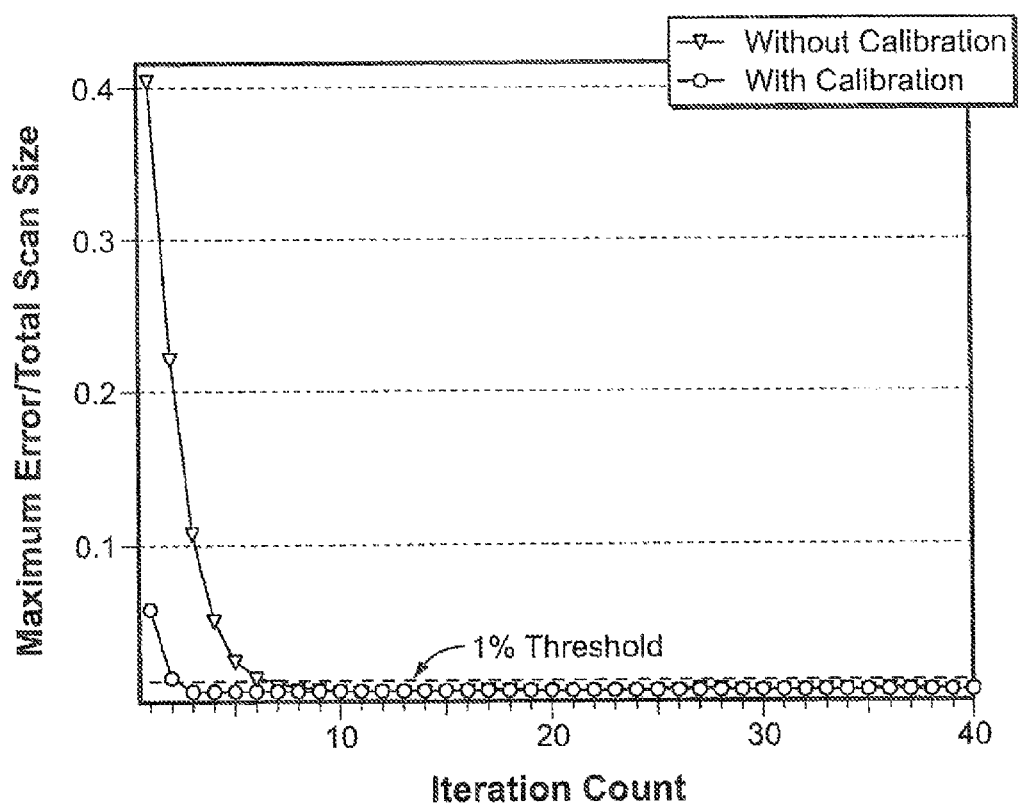
FIG. 12 is a graph illustrating operation of the feed forward algorithm of FIG. 7, with and without calibration.

The performance of controller 100 is illustrated in FIGS. 10-12. The vertical axis represents the voltage signal of the corresponding signals while the lateral axis is the time in milliseconds. All the signals are sampled simultaneously at different test points in FIG. 6. FIG. 10 illustrates a first curve labeled "Reference Signal 1," which is a pure triangle wave illustrating the desired motion of a scanner, e.g., a raster scan. Curve "Drive Signal 2" illustrates the drive signal $u_{ff}$ that is produced by the controller to correct probe-sample position errors. Drive signal (i.e., $u_{ff}$) yields a sensor signal labeled "Sensor Signal" that is substantially coincidental the pure triangle waveform intended to be produced by the scanner, i.e., Reference Signal. The error between the pure triangle signal or waveform (the Reference Signal) and the sensed actuator motion "Sensor Signal" produces an error profile represented by "Error Signal." The "Error Signal" is kept to a minimum through a combination of low bandwidth feedback with high frequency error compensation using feed forward control algorithm 120 of controller 100. For the case shown in FIG. 10, this amount of error is accomplished in about 3-4 iterations of feed forward algorithm 120.

FIG. 11 illustrates a blown up version in the vertical axis of the actuator response illustrated in FIG. 10. More particularly, waveforms "Error Signal Before Iteration (ESBI)" and "Error Signal After Iteration (ESAI)" illustrate the error associated with driving the actuator with controller 100. More particularly, waveform "ESBI" illustrates the initial error after the first operation of feed forward algorithm 120. Though relatively large to start, after about 3 to 4 iterations of the feed forward algorithm, the error is reduced to that shown schematically by waveform ESAI. It is this amount of error that is less than the threshold required for scanning at high speeds without degrading image quality, i.e., position error is ideally less than 1% of the scan size. Note that ESBI illustrates that the error is typically the greatest at the transition points of the raster scan, and as such, does not significantly impact the resultant image generated by the acquired data.

Turning to FIG. 12, the number of iterations of feed forward algorithm 120 to achieve the selected amount of error for fast scanning according to one embodiment of the invention is shown. For the case in which the scanner is not calibrated, the number of iterations to achieve, in this case, 1% maximum error of the total scan size is about 7 to 8 iterations of the feed forward algorithm. With the scanner calibrated, however, the 1% threshold can be achieved in 3 to 4 iterations as described above. In either case, high integrity fast scanning can be performed within about 2 seconds of initiating the scan.

In sum, the controller 100 and associated control algorithms of the current invention can improve the scanning speed of a conventional AFM scanner by greater than an order of magnitude. The low bandwidth feedback controller substantially eliminates the effects of low frequency or DC components of the positioning error, while the adaptive-based feed forward control algorithm 120 minimizes the adverse effects on actuator position associated with high frequency sensor dynamics and non-linearity. The two signals produced by each of the control branches, $u_{fb}$ and $u_{ff}$ are combined to provide a control signal u which yields substantially linear scanner motion that follows the reference, such as that shown in FIG. 5, at improved speeds greater than $\frac{1}{100}^{th}$ of the fundamental resonant frequency of the scanner (actuator), and preferably greater than $\frac{1}{10}^{th}$ the resonant frequency of the scanner, and more preferably, $\frac{1}{3}^{rd}$. For a typical piezoelectric actuator usable in the contemplated applications (resonant frequency of about 900 Hz), this means scanning at 300 Hz is possible without compromising image quality.

Figure 13:
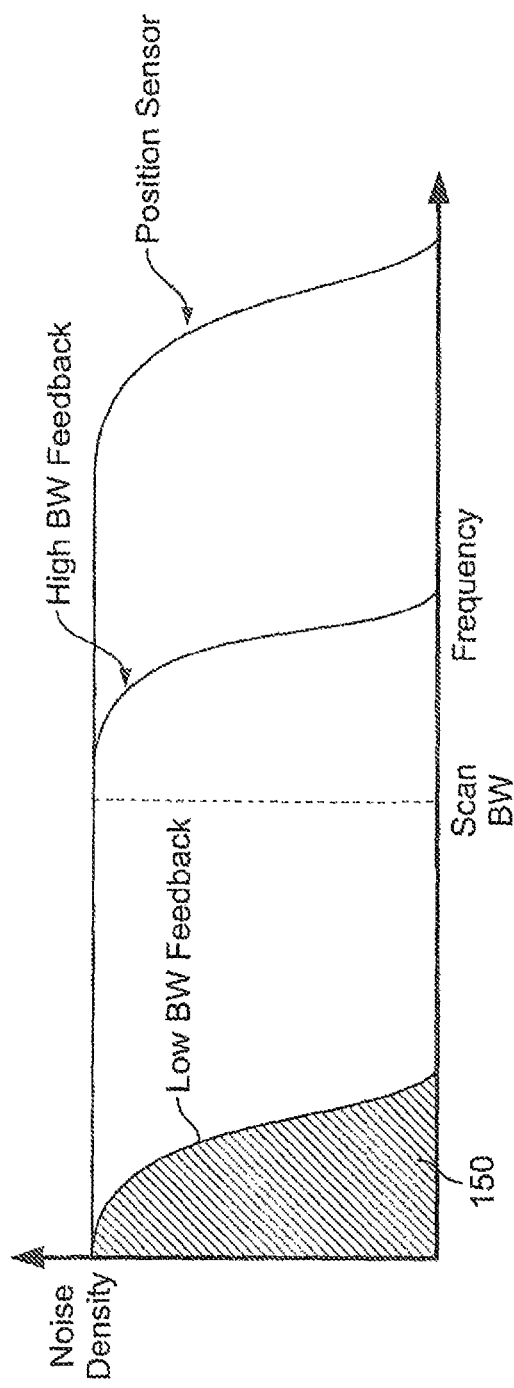
FIG. 13 is a graph illustrating position sensor noise power density versus operating frequency, illustrating a scan bandwidth selected for desired noise attenuation.

The operation of controller 100 is shown schematically in FIG. 13, a plot of noise density versus scanner frequency. As shown, if the scan bandwidth is set at an appropriate frequency, the feed forward contribution, $u_{ff}$, to the scanner control signal, u, can be employed to compensate for high frequency position errors. The feedback control loop and its contribution, $u_{fb}$, to the scanner control signal, u, is operated at low bandwidth sufficient to correct low bandwidth contributions to position error, such as creep and thermal drift. In this way, the noise from the position sensor of the feedback loop, and its contribution to noise density, is essentially minimized. For example, the scan bandwidth can be set to about seven times the scan frequency while minimizing the impact of position sensor noise. In sum, by operating feedback loop 104 (FIG. 6) at low bandwidth, the noise introduced by the position sensor is minimized to the area 150 shown schematically in FIG. 13. As a result, image integrity is not degraded appreciably while scanning at significantly greater speeds with feed forward algorithm 120 operating to provide a correction for high frequency position errors.

Figure 14B:
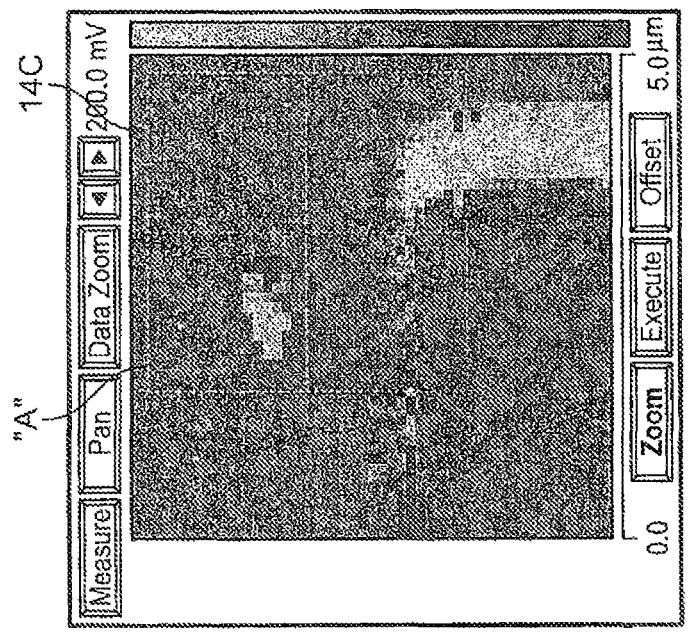
FIGS. 14A, 14B and 14C illustrate sample images taken by an AFM employing a controller according to the preferred embodiments.
Figure 14A:
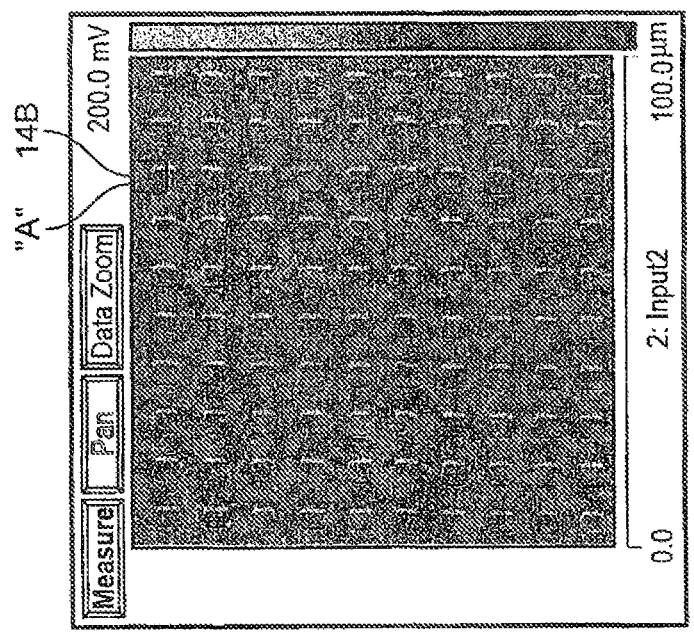
Figure 14C:
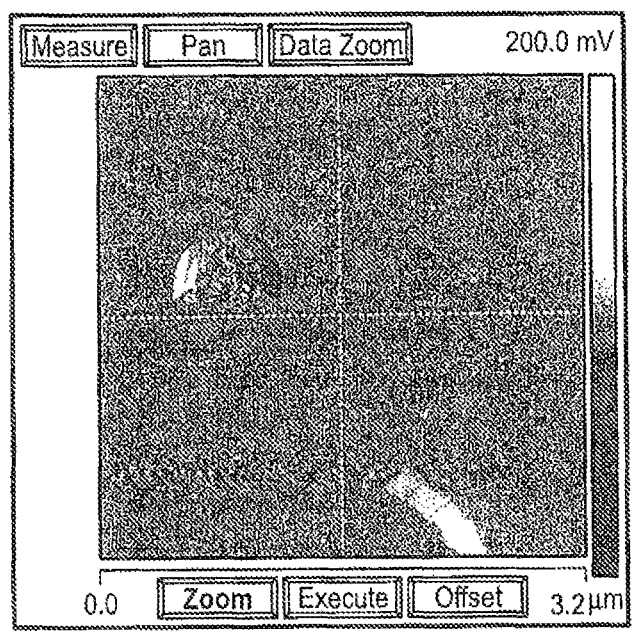

One practical effect of the more precise positioning provided by the preferred embodiments is illustrated in FIGS. 14A-14C. FIG. 14A illustrates a sample of a calibration grating (10 micron pitch size, 100 micron scan size, 10 Hz) having a region of interest marked "A" that is to be imaged at high resolution. To move from the probe-sample position shown in FIG. 14A to the zoomed location "A" while operating the actuator at a high frequency, position errors should be substantially maintained, for example, at about 1% of the scan size as achieved by the preferred embodiments. In that case, region "A" will lie in the zoomed location. This is in contrast to known AFMs and their associated control technology given that the error at high scan frequencies is large, for example in the range of, for instance, about 10%. In such a case, moving from a 100×100 µm scan range to a 1×1 µm sub-region would yield an error of about 10 µm, an amount too great to allow the AFM to reliably position the probe and sample so that region "A" remains within the commanded probe-sample position. FIG. 14B illustrates the zoomed location "A" (approximately 5 micron area) using the controller described previously. Turning to FIG. 14C, an image associated with a new scan of the area shown in FIG. 14B (about a 3.2 micron scan at 10 Hz) using the present controller illustrates low noise and precise positioning of the scanner without creep.

Figure 15A:
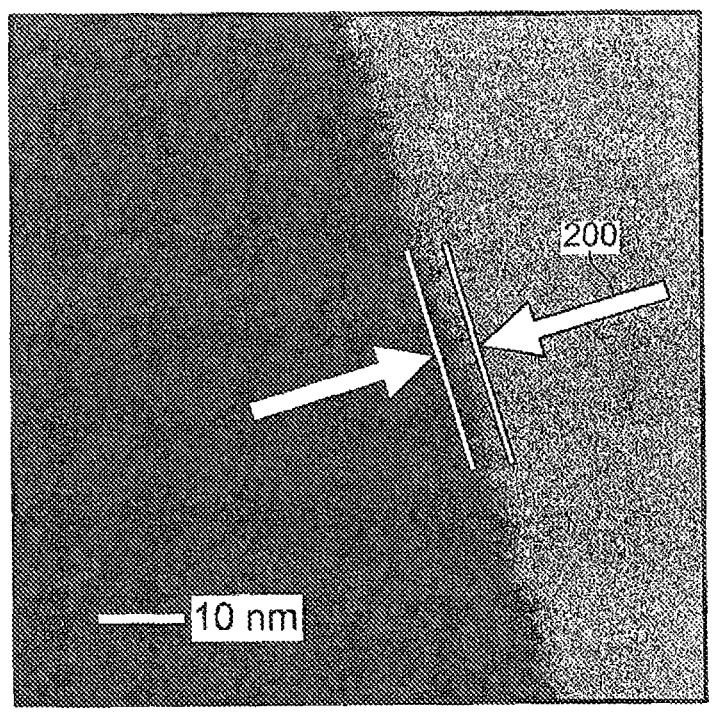
FIGS. 15A, 15B and 15C schematically illustrate images of a sample having a sharp edge, using the preferred embodiments.
Figure 15B:
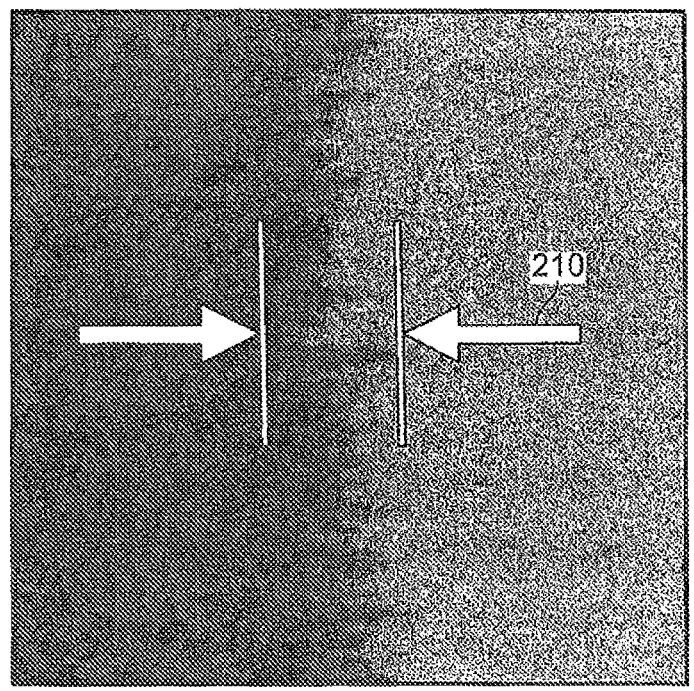
Figure 15C:
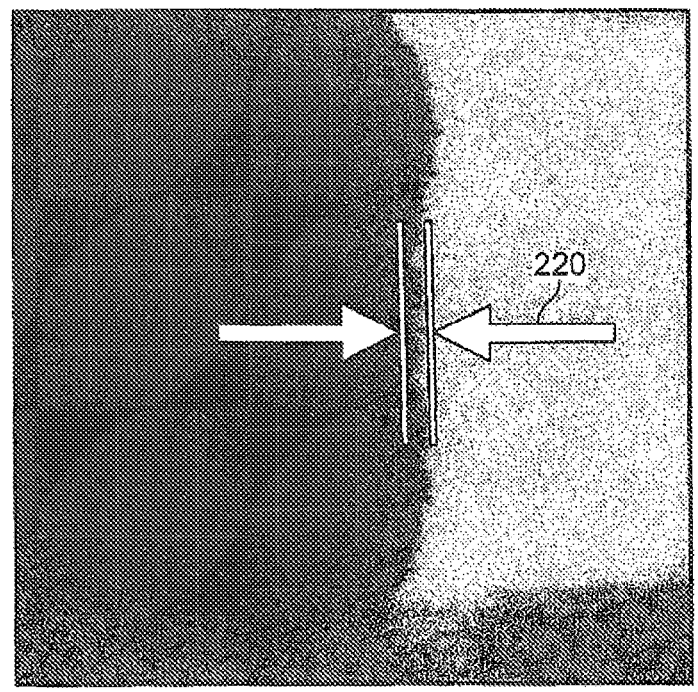

Turning to FIGS. 15A-15C, the effect of noise on probe-sample positioning using known AFMs as well as the present invention is illustrated. Corresponding sample images are of an edge feature imaged using an AFM having an open loop position controller, FIG. 15A, and a closed loop position controller, FIG. 15B, with the image of FIG. 15C showing an image obtained using an AFM incorporating the present invention. More particularly, FIG. 15A illustrates the edge feature with low noise (amplitude 200) given the lack of a position sensor. FIG. 15B is an edge image using a conventional closed loop controller which processes sensor noise thereby producing a noisy image. As shown, noise 210 is significantly greater than noise 200, as expected. FIG. 15C is an image obtained using the present invention in which the same positioning accuracy and linearity of a closed loop controller is maintained while achieving the noise performance of open loop imaging. In other words, actuator noise 220 is reduced significantly compared to the closed loop noise 210, and is more in the range of the open loop noise 200 shown in FIG. 15A.

Although the best mode contemplated by the inventors of carrying out the present invention is disclosed above, practice of the present invention is not limited thereto. For instance, for very small scan sizes, such as tens to hundreds of nanometers, the adaptive procedure of the IIC control algorithm can be bypassed completely to avoid divergence of calculation. It will be manifest that various additions, modifications and rearrangements of the features of the present invention may be made without deviating from the spirit and scope of the underlying inventive concept.

What is claimed is:

1. A method of operating a metrology instrument, comprising:
    generating relative motion between a probe and a sample at a scan frequency using an actuator having a fundamental resonance frequency;
    detecting motion of the actuator using a position sensor, wherein the position sensor exhibits noise in the detected motion;
    controlling the XY position of the actuator with a control signal, u, using both a feedback loop and a feed forward algorithm, wherein a feedback signal, $u_{fb}$, associated with the feedback loop is updated during operation of the metrology instrument by combining a signal associated with a predetermined path defined by the feed forward algorithm therewith;
    wherein the the scan frequency is greater than $\frac{1}{100}$th of the fundamental resonant frequency; and
    wherein the bandwidth of the feedback loop is different than a bandwidth associated with operation of the feedforward algorithm.

2. The method of claim 1, wherein the controlling step includes operating the feedback loop at a bandwidth less than the scan frequency associated with the generating step thereby attenuating noise in the actuator position compared to the noise in the detected motion in the corresponding bandwidth, and wherein the feed forward algorithm substantially continuously updates the control signal so that the XY motion of the actuator substantially follows a reference thereby compensating for the non-linear response.

3. The method of claim 1, wherein the feed forward algorithm includes using an inversion-based control algorithm.

4. The method of claim 3, wherein the inversion-based control algorithm adaptively produces a correction that contributes to a control signal that compensates for at least one of the non-linearities and the dynamics of the actuator.

5. The method of claim 4, wherein the control signal produces a peak position error of less than about 1% of the total scan range after no more than about 10 iterations of 10 scan lines per iteration.

6. The method of claim 5, wherein the control signal produces a peak position error of less than about 1% of the total scan range after no more than about 5 seconds.

7. The method of claim 1, wherein the fundamental resonant frequency of the actuator is greater than about 100 Hz and the scan frequency is at least about 100 Hz.

8. The method of claim 7, wherein the scan frequency is at least about 300 Hz.

9. The method of claim 1, wherein the bandwidth of the feedback loop is less than the scan frequency.

10. The method of claim 1, wherein the bandwidth of the feedback loop is less than about 10 hz.

11. The method of claim 1, wherein the controlling step attenuates the noise in the actuator position to less than about 1 Angstrom RMS within a noise bandwidth equal to about seven times the scan frequency.

12. The method of claim 11, wherein the controlling step includes using a PI controller.

13. A method of operating a metrology instrument, comprising:
generating, with an actuator exhibiting a non-linear response, relative motion between a probe and a sample at a scan frequency over a scan size;
detecting motion of the actuator using a position sensor;
calibrating the actuator to generate an initial scan table;
controlling the XY position of the actuator with a control signal, u, using both a feedback loop and a feed forward algorithm, wherein a feedback signal, $u_{fb}$, associated with the feedback loop is updated during operation of the metrology instrument by combining a signal, $u_{ff}$, associated with a predetermined path defined by the feed forward algorithm therewith, wherein the scan table is updated repeatedly during operation to generate $u_{ff}$ thereby causing the feed forward algorithm to substantially continuously update the control signal so that the XY motion of the actuator substantially follows a reference thereby compensating for the non-linear response; and
wherein the bandwidth of the feedback loop is less than about 10 Hz, and the bandwidth of the feedforward algorithm is greater than about 300 Hz, and the scan frequency is greater than 100 Hz.

14. The method of claim 13, wherein the feed forward algorithm is an adaptive feed forward algorithm that estimates a transfer faction of the actuator in response to the position error and adjusts the generating step based at least in part on the transfer function.

15. The method of claim 14, wherein the response of the actuator is dependent on an operating condition, wherein the operation condition is at least one of scan frequency, size, angle, and offset.

16. The method of claim 13, wherein the scan frequency is greater than about 300 Hz.

17. A scanning probe microscope (SPM) comprising:
an actuator exhibiting a non-linear response that generates relative motion between a probe and a sample at a scan frequency;
a sensor that detects motion of the actuator and generates noise;
a controller including a feedback loop that generates an XY position control signal, u, based on the detected motion;
wherein the actuator is calibrated to generate an initial scan table;
wherein a feedback signal, $u_{fb}$, associated with the feedback loop is updated during operation of the metrology instrument by combining a signal, $u_{ff}$, associated with the scan table, wherein the scan table is updated repeatedly during operation to generate $u_{ff}$ thereby causing the feed forward algorithm to substantially continuously update the control signal;
wherein the bandwidth of the feedback loop is less than the scan frequency thereby attenuating noise in the actuator position compared to the noise in the detected motion; and
wherein the bandwidth of the feedback loop is different than a bandwidth associated with operation of the feedforward algorithm.

18. The SPM of claim 17, wherein the XY motion of the actuator substantially follows a reference thereby compensating for the non-linear response.

* * * * *